United States Patent
Singer et al.

(10) Patent No.: US 12,204,745 B2
(45) Date of Patent: *Jan. 21, 2025

(54) METHODS AND APPARATUS TO ENABLE A TRADING DEVICE TO ACCEPT A USER INPUT

(71) Applicant: TRADING TECHNOLOGIES INTERNATIONAL INC., Chicago, IL (US)

(72) Inventors: Scott F. Singer, Green Oaks, IL (US); Farley Owens, Chicago, IL (US)

(73) Assignee: TRADING TECHNOLOGIES INTERNATIONAL INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/494,031

(22) Filed: Oct. 25, 2023

(65) Prior Publication Data

US 2024/0053883 A1 Feb. 15, 2024

Related U.S. Application Data

(63) Continuation of application No. 17/875,739, filed on Jul. 28, 2022, now Pat. No. 11,847,315, which is a (Continued)

(51) Int. Cl.
*G06F 3/04883* (2022.01)
*G06F 21/10* (2013.01)
(Continued)

(52) U.S. Cl.
CPC .......... *G06F 3/04883* (2013.01); *G06F 21/10* (2013.01); *G06F 21/316* (2013.01);
(Continued)

(58) Field of Classification Search
CPC ..... G06F 3/04883; G06F 21/10; G06Q 40/04; H04L 67/42
See application file for complete search history.

(56) References Cited

U.S. PATENT DOCUMENTS 5,612,719 A 3/1997 Beernink et al.
6,154,723 A 11/2000 Cox et al.
(Continued)

FOREIGN PATENT DOCUMENTS

EP 2060970 A1 5/2009
EP 2597585 A1 5/2013
(Continued)

OTHER PUBLICATIONS

Anonymous: "FingerWorks—Gesture Guide—File Operations", Internet Citation, Jun. 18, 2004, XP002404589, Retrieved from the Internet: URL:http://web.archive.org/web/20040618040236/www.fingerworks.com/gesture guidefiles.html, [retrieved on Oct. 26, 2006], p. 1.

(Continued)

*Primary Examiner* — Nhat Huy T Nguyen
(74) *Attorney, Agent, or Firm* — MCDONNELL BOEHNEN HULBERT & BERGHOFF LLP

(57) ABSTRACT

Methods and apparatus to enable a trading device to accept a user input are disclosed. An example method includes generating, via a computing device, a user interface of a trading application, wherein the user interface includes a locked portion that displays market data. The example method also includes detecting a gestural input with respect to the user interface. The example method also includes detecting a gestural event with respect to the user interface associated with the gestural input and, in response to the detected gestural event, unlocking the locked portion of the user interface.

10 Claims, 19 Drawing Sheets

Related U.S. Application Data continuation of application No. 14/142,844, filed on Dec. 28, 2013, now Pat. No. 11,435,895.

(51) Int. Cl.
- *G06F 21/31* (2013.01)
- *G06F 21/36* (2013.01)
- *G06Q 40/04* (2012.01)
- *H04L 67/01* (2022.01)
- *H04L 67/50* (2022.01)
- *H04L 67/52* (2022.01)

(52) U.S. Cl.
CPC ............ *G06F 21/36* (2013.01); *G06Q 40/04* (2013.01); *H04L 67/01* (2022.05); *H04L 67/52* (2022.05); *H04L 67/535* (2022.05)

(56) References Cited

U.S. PATENT DOCUMENTS

| | | | |
|---|---|---|---|
| 6,311,214 | B1 | 10/2001 | Rhoads |
| 6,317,132 | B1 | 11/2001 | Perlin |
| 6,772,132 | B1 | 8/2004 | Kemp, II et al. |
| 6,825,861 | B2 | 11/2004 | Wasko et al. |
| 6,856,259 | B1 | 2/2005 | Sharp |
| 7,546,550 | B1 | 6/2009 | Buck |
| 7,554,530 | B2 | 6/2009 | Mizobuchi et al. |
| 7,559,036 | B1 | 7/2009 | Buck |
| 7,580,883 | B2 | 8/2009 | Borts |
| 7,788,604 | B2 | 8/2010 | Wasko et al. |
| 7,818,691 | B2 | 10/2010 | Irvine |
| 8,027,908 | B2 | 9/2011 | Borts |
| 8,037,422 | B1 | 10/2011 | Buck |
| 8,174,503 | B2 | 5/2012 | Chin |
| 8,201,109 | B2 | 6/2012 | Van Os et al. |
| 8,239,784 | B2 | 8/2012 | Hotelling et al. |
| 8,416,217 | B1 | 4/2013 | Eriksson et al. |
| 8,442,890 | B2 | 5/2013 | Brumfield et al. |
| 8,578,288 | B2 | 11/2013 | Wasko et al. |
| 8,587,519 | B2 | 11/2013 | Shaw et al. |
| 8,620,794 | B2 | 12/2013 | Borts |
| 8,633,903 | B2 | 1/2014 | Kim et al. |
| 8,713,478 | B2 | 4/2014 | Buck |
| 9,268,966 | B1 | 2/2016 | Amacker et al. |
| 9,606,668 | B2 | 3/2017 | Hotelling et al. |
| 9,727,915 | B2 | 8/2017 | Singer |
| 9,733,739 | B1 | 8/2017 | Yates et al. |
| 10,037,125 | B2 | 7/2018 | Buck |
| 2004/0150668 | A1 | 8/2004 | Myers et al. |
| 2004/0246240 | A1 | 12/2004 | Kolmykov-Zotov et al. |
| 2005/0004852 | A1 | 1/2005 | Whitney |
| 2005/0089225 | A1 | 4/2005 | Chang et al. |
| 2006/0026536 | A1 | 2/2006 | Hotelling et al. |
| 2006/0129475 | A1 | 6/2006 | Badenhorst et al. |
| 2006/0284852 | A1* | 12/2006 | Hofmeister ............ G06F 3/0483 345/173 |
| 2006/0284893 | A1 | 12/2006 | Hlad et al. |
| 2007/0139370 | A1 | 6/2007 | Lu et al. |
| 2007/0150401 | A1 | 6/2007 | Brucato et al. |
| 2007/0152984 | A1 | 7/2007 | Ording et al. |
| 2007/0156565 | A1 | 7/2007 | Singer et al. |
| 2007/0156570 | A1 | 7/2007 | Singer et al. |
| 2007/0265954 | A1 | 11/2007 | Mather et al. |
| 2008/0025645 | A1 | 1/2008 | Jakobson et al. |
| 2008/0117168 | A1 | 5/2008 | Liu et al. |
| 2008/0243710 | A1 | 10/2008 | Borts |
| 2009/0027338 | A1 | 1/2009 | Weinberg et al. |
| 2009/0319950 | A1 | 12/2009 | Borts |
| 2010/0020035 | A1 | 1/2010 | Ryu et al. |
| 2010/0042954 | A1 | 2/2010 | Rosenblatt et al. |
| 2010/0088654 | A1 | 4/2010 | Henhoeffer |
| 2010/0162139 | A1 | 6/2010 | Beebe et al. |
| 2010/0248689 | A1* | 9/2010 | Teng ................... H04W 12/082 455/411 |
| 2010/0269040 | A1 | 10/2010 | Lee |
| 2010/0283742 | A1 | 11/2010 | Lam |
| 2010/0289754 | A1 | 11/2010 | Sleeman et al. |
| 2010/0306693 | A1 | 12/2010 | Brinda |
| 2010/0333195 | A1 | 12/2010 | Wang |
| 2011/0080351 | A1 | 4/2011 | Wikkerink et al. |
| 2011/0088086 | A1 | 4/2011 | Swink et al. |
| 2011/0099513 | A1 | 4/2011 | Ameline |
| 2011/0112952 | A1 | 5/2011 | Annunziata et al. |
| 2011/0138275 | A1 | 6/2011 | Yu |
| 2011/0234491 | A1 | 9/2011 | Nurmi |
| 2011/0256848 | A1 | 10/2011 | Bok et al. |
| 2011/0307371 | A1 | 12/2011 | Borts |
| 2011/0310041 | A1 | 12/2011 | Williams et al. |
| 2011/0320337 | A1 | 12/2011 | Buck |
| 2012/0005059 | A1 | 1/2012 | Buck |
| 2012/0044179 | A1 | 2/2012 | Hudson |
| 2012/0046079 | A1 | 2/2012 | Kim et al. |
| 2012/0068950 | A1 | 3/2012 | Conde et al. |
| 2012/0079586 | A1 | 3/2012 | Brown et al. |
| 2012/0089948 | A9 | 4/2012 | Lim et al. |
| 2012/0123558 | A1 | 5/2012 | Gill |
| 2012/0176401 | A1 | 7/2012 | Hayward et al. |
| 2012/0182226 | A1 | 7/2012 | Tuli |
| 2012/0212438 | A1 | 8/2012 | Vaisanen |
| 2012/0233571 | A1 | 9/2012 | Wever et al. |
| 2012/0254808 | A1 | 10/2012 | Gildfind |
| 2012/0256959 | A1 | 10/2012 | Ye et al. |
| 2012/0265664 | A1 | 10/2012 | Triplett et al. |
| 2012/0275648 | A1 | 11/2012 | Guan |
| 2012/0284297 | A1 | 11/2012 | Aguera-Arcas et al. |
| 2012/0284673 | A1 | 11/2012 | Lamb et al. |
| 2012/0284789 | A1 | 11/2012 | Kim et al. |
| 2012/0291101 | A1 | 11/2012 | Ahlstrom et al. |
| 2012/0317509 | A1 | 12/2012 | Ludwig et al. |
| 2013/0007666 | A1 | 1/2013 | Song et al. |
| 2013/0055348 | A1 | 2/2013 | Strauss et al. |
| 2013/0063380 | A1 | 3/2013 | Wang et al. |
| 2013/0093705 | A1 | 4/2013 | Huang |
| 2013/0093707 | A1 | 4/2013 | Park et al. |
| 2013/0111379 | A1 | 5/2013 | Hong et al. |
| 2013/0113714 | A1 | 5/2013 | Mao |
| 2013/0127592 | A1 | 5/2013 | Fyke et al. |
| 2013/0159927 | A1 | 6/2013 | Chuang et al. |
| 2013/0162513 | A1 | 6/2013 | Ronkainen |
| 2013/0162667 | A1 | 6/2013 | Eskolin et al. |
| 2013/0167074 | A1 | 6/2013 | Oonishi et al. |
| 2013/0169549 | A1 | 7/2013 | Seymour et al. |
| 2013/0283215 | A1 | 10/2013 | Sundaramurthy et al. |
| 2013/0297474 | A1 | 11/2013 | Creamer et al. |
| 2013/0311955 | A9 | 11/2013 | de Leon |
| 2013/0312083 | A1* | 11/2013 | Farraro ............... G06F 3/04845 726/16 |
| 2014/0035843 | A1 | 2/2014 | Zo et al. |
| 2014/0055235 | A1 | 2/2014 | Choi |
| 2014/0085271 | A1 | 3/2014 | Hwang et al. |
| 2014/0085460 | A1 | 3/2014 | Park et al. |
| 2014/0143785 | A1 | 5/2014 | Mistry et al. |
| 2014/0157209 | A1 | 6/2014 | Dalal et al. |
| 2014/0191986 | A1 | 7/2014 | Kim et al. |
| 2014/0195411 | A1 | 7/2014 | Buck |
| 2014/0229359 | A1 | 8/2014 | Borts |
| 2014/0253461 | A1 | 9/2014 | Hicks et al. |
| 2014/0279344 | A1 | 9/2014 | Creamer et al. |
| 2014/0358782 | A1 | 12/2014 | Gura et al. |
| 2015/0029225 | A1 | 1/2015 | Aigner |
| 2015/0081502 | A1 | 3/2015 | Singer |
| 2015/0082252 | A1 | 3/2015 | Chaudhri et al. |
| 2015/0088722 | A1 | 3/2015 | Singer |
| 2015/0123925 | A1* | 5/2015 | Qin ..................... G06F 3/04817 345/173 |
| 2015/0160788 | A1 | 6/2015 | Sun et al. |
| 2015/0186028 | A1 | 7/2015 | Singer et al. |
| 2016/0224119 | A1 | 8/2016 | Wu |
| 2017/0206605 | A1 | 7/2017 | Borts |

(56) References Cited

U.S. PATENT DOCUMENTS

2017/0301023 A1  10/2017  Singer
2018/0321800 A1  11/2018  Buck

FOREIGN PATENT DOCUMENTS

EP    2608007 A2   6/2013
FR    2985583 A1   7/2013
RU    2439653 C2   1/2012

OTHER PUBLICATIONS

Villamor, C., et al.: "Touch Gesture Reference Guide", Apr. 15, 2010, XP055024104, Retrieved from the Internet: URL:http://web.archive.org/web/20100601214053/http://www.lukew.com/touch/TouchGestureGuide.pdf [retrieved on Apr. 10, 2012], p. 1.
Extended European Search Report in European Patent Application No. 14874482.4 dated Aug. 7, 2017, mailed Aug. 18, 2017.
International Search Report and Written Opinion of International Application No. PCT/US2014/068783, dated Jan. 29, 2015 (mailed Mar. 3, 2015).
Unpublished U.S. Appl. No. 12/504,412, filed April Jul. 16, 2009.
Notice of Intent to Grant European Patent Application 14874482.4 dated Sep. 25, 2019.

\* cited by examiner

METHODS AND APPARATUS TO ENABLE A TRADING DEVICE TO ACCEPT A USER INPUT

CROSS REFERENCE TO RELATED APPLICATIONS

The present application is a continuation of U.S. patent application Ser. No. 17/875,739, filed Jul. 28, 2022, which is a continuation of U.S. patent application Ser. No. 14/142,844, filed Dec. 28, 2013 which is herewith incorporated by reference into the present application.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

Advances in mobile devices have resulted in improved touch screens that allow users to directly interact with what is displayed. For example, a user may play a game, write an email, file taxes, etc., by directly interacting with the user interface of the touch screen, rather than using an intermediary device such as a mouse, a keyboard, etc.

BRIEF DESCRIPTION OF THE FIGURES

Certain embodiments are disclosed with reference to the following drawings.

Figure 1:
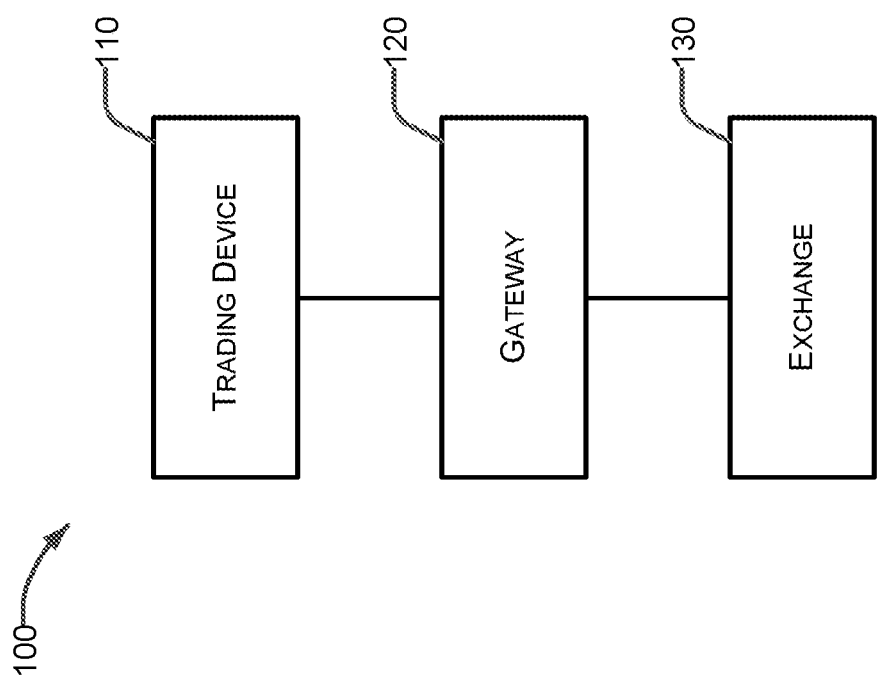
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading and, more particularly, to methods and apparatus to enable a trading device to accept a user input.

In general, a market participant desires to be able to react more quickly than other market participants. For example, a market participant (or trader or other user) generally desires to be "first-to-market" (e.g., to have trade orders entered prior to other market participants entering the same or similar orders). It is therefore desirable to improve the way market data is displayed to the market participant and to allow the market participant to make fast and accurate order entry. The slightest speed advantage may give a market participant a significant competitive advantage.

Trading applications allow market participants to initiate trade actions via a trading device. In some examples, a trading application user interface may present (e.g., display) market data or other information via a trading window(s) or trading screen(s). For example, a trading window may be a portion of the user interface and display market updates, charts, positions, news, analysis, etc. In addition, a trading window may include a trade action control for initiating or executing a trade action. A trade action control is a button, a cell, or an area in a trading window that corresponds to a particular trade action. When a trade action control is enabled (e.g., unlocked or activated), selection of the trade action control initiates the corresponding trade action, such as placing, cancelling or changing a trade order. In contrast, selection of a disabled (or locked) trade action control is discarded or ignored, and the corresponding trade action is not initiated.

Touch screens allow a market participant to directly or indirectly interact with a trading application via, for example, the trading application user interface. In some examples, the market participant operates (e.g., executes) the trading application by directly interacting with the components displayed in the user interface via the touch screen. For example, a market participant may initiate a trade action (e.g., communicate a sell order, communicate a buy order, etc.) by directly selecting a trade action control (e.g., a button) corresponding to the desired trade action. Directly interacting with the user interface may be useful in that it eliminates (or nearly eliminates) the need for additional peripherals to initiate a trade action (e.g., controlling a computer mouse to select a trade action control). As a result, a trade action may be initiated (and thereby executed) more efficiently by the market participant. Although touch screens allow for relatively quicker interaction than indirect interaction, touch screens also increase the risk of accidentally selecting a trade action control and initiating and/or executing an unwanted trade action. To this end, examples disclosed herein include preventing unintentional selections on user interface controls on a touch screen. Some examples include detecting a gestural event with a user interface that is "disabled" or "locked" before the user interface is unlocked for user interaction with, for example, a trade action control.

Some embodiments recognize that directly interacting with a trading application (e.g., via a user interface) may lead to instances where a trade action control is accidentally selected. Accordingly, some embodiments include a trading device with a user interface in a locked mode wherein selection of a component of the user interface (e.g., a trading window, a trade action control, a user interface control, etc.) is disabled. In some examples, the user interface (e.g., a trading window included in the user interface) may display market data, charts, positions, news, analysis, etc. that is relevant or important to the user while in the locked mode. In some examples, the user interface may be "live" and the information displayed by the user interface (e.g., market data) may refresh or update while the user interface remains in the locked mode. According to some embodiments, user interaction with the user interface, including components of the user interface (e.g., a trading window, a trade action control) is enabled when the user interface is in an unlocked mode.

In some embodiments, the locked user interface may be unlocked when a gestural event is detected. In some embodiments, the gestural event is detected in conjunction with a gestural input. An example gestural input may include a multi-touch interaction (e.g., using two or more fingers) with a touch screen, a touch pad, a track pad, etc., of a trading device. In some such embodiments, the locked user interface may unlock to enable user interaction with the user interface in response to detecting a gestural event such as the rotation of the two or more fingers of the gestural input in a first direction (e.g., in a counter-clockwise direction, etc.). In addition, in some such examples, an unlocked user interface may lock to disable (or prevent) user interaction with the user interface in response to detecting the user rotate the two or more fingers in a second direction (e.g., in a clockwise direction, etc.). In some examples, the unlocked user interface may lock after a period of inactivity (e.g., a period during which user interaction is not detected).

In some embodiments, the user interface may be in an unlocked mode while a component may be in a locked mode. For example, a user may change a trading window displaying trade orders for a tradeable object to a trading window showing market fills for the tradeable object. However, while the user may interact with portions of the trading window, the user may not initiate a trade action. In some embodiments, trade action controls (e.g., trade action controls that place, cancel or change a trade order) are disabled. In some such examples, the trade action control may be activated when a gestural event such as holding a gestural input is detected. For example, selecting and holding an activation control displayed in the user interface or a trading window may activate a trade action control. In addition, in some examples, the activated trade action control may lock or disable user interaction when the activation control is released.

In some embodiments, selecting and holding the activation control may activate a trading window. For example, a first trading window in a user interface may display to the user trading positions for tradeable objects and a second trading window may display charts pertaining to the tradeable objects. In some embodiments, when the activation control is selected and held, the second trading window may display trade action controls corresponding to the trading positions displayed in the first trading window.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Certain embodiments provide a method including generating, via a computing device, a user interface of a trading application, wherein the user interface includes a locked portion that displays market data. The example method also includes detecting a gestural input with respect to the user interface. The example method also includes detecting a gestural event with respect to the user interface associated with the gestural input and, in response to the detected gestural event, unlocking the locked portion of the user interface.

Certain embodiments provide an apparatus including a computing device to generate a user interface of a trading application, wherein the user interface is to include a locked portion that is to display market data. The example computing device is also to detect a gestural input with respect to the user interface. The example computing device is also to detect a gestural event with respect to the user interface associated with the gestural input and, in response to the detected gestural event, unlock the locked portion of the user interface.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application may be executed to arrange and display market data in one or more trading windows. In another example, a trading application may include an automated spread trading application providing spread trading tools. In yet another example, a trading application may include an algorithmic trading application that automatically processes an algorithm and performs certain trade actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) that also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
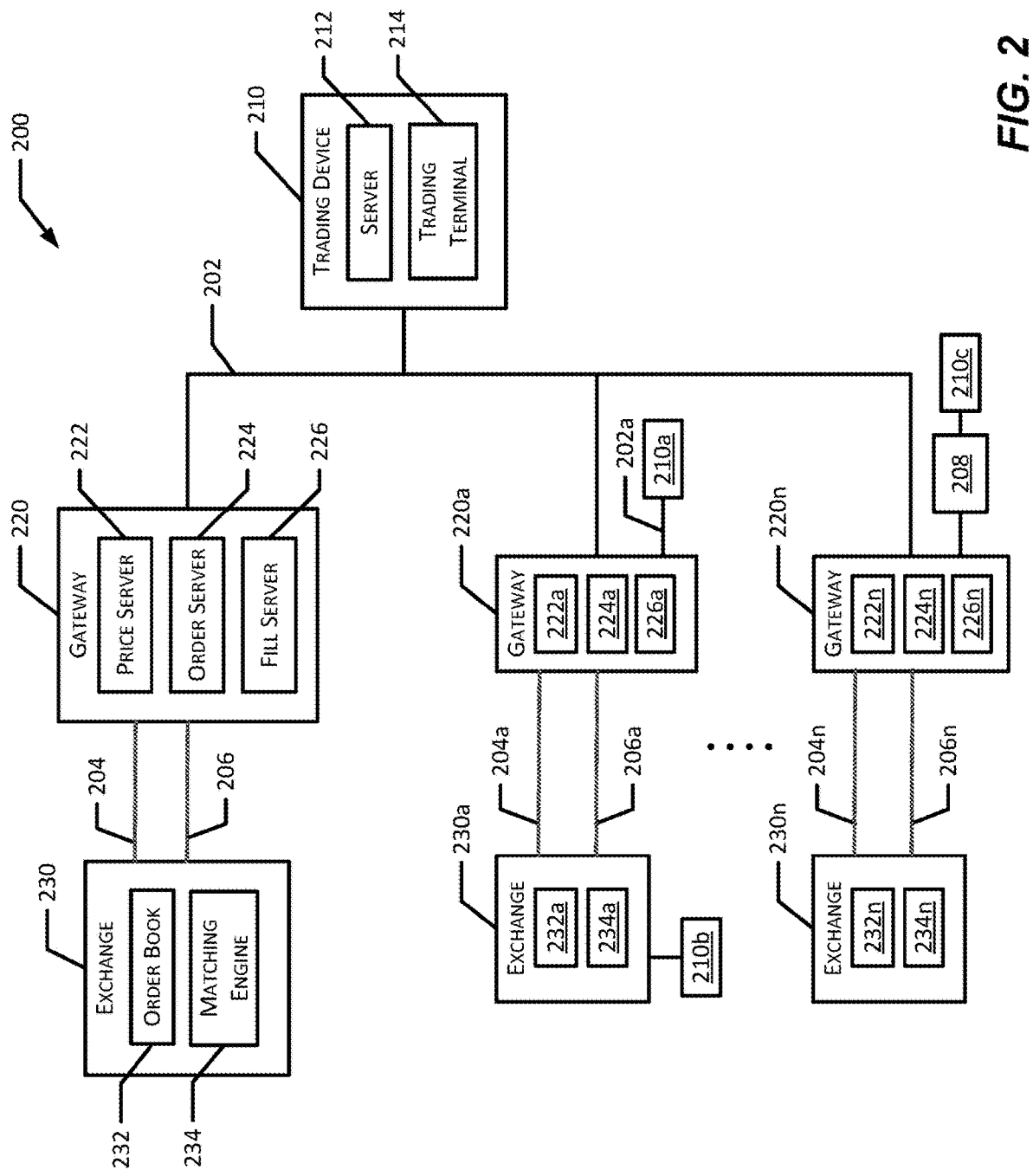
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. EXAMPLE COMPUTING DEVICE

Figure 3:
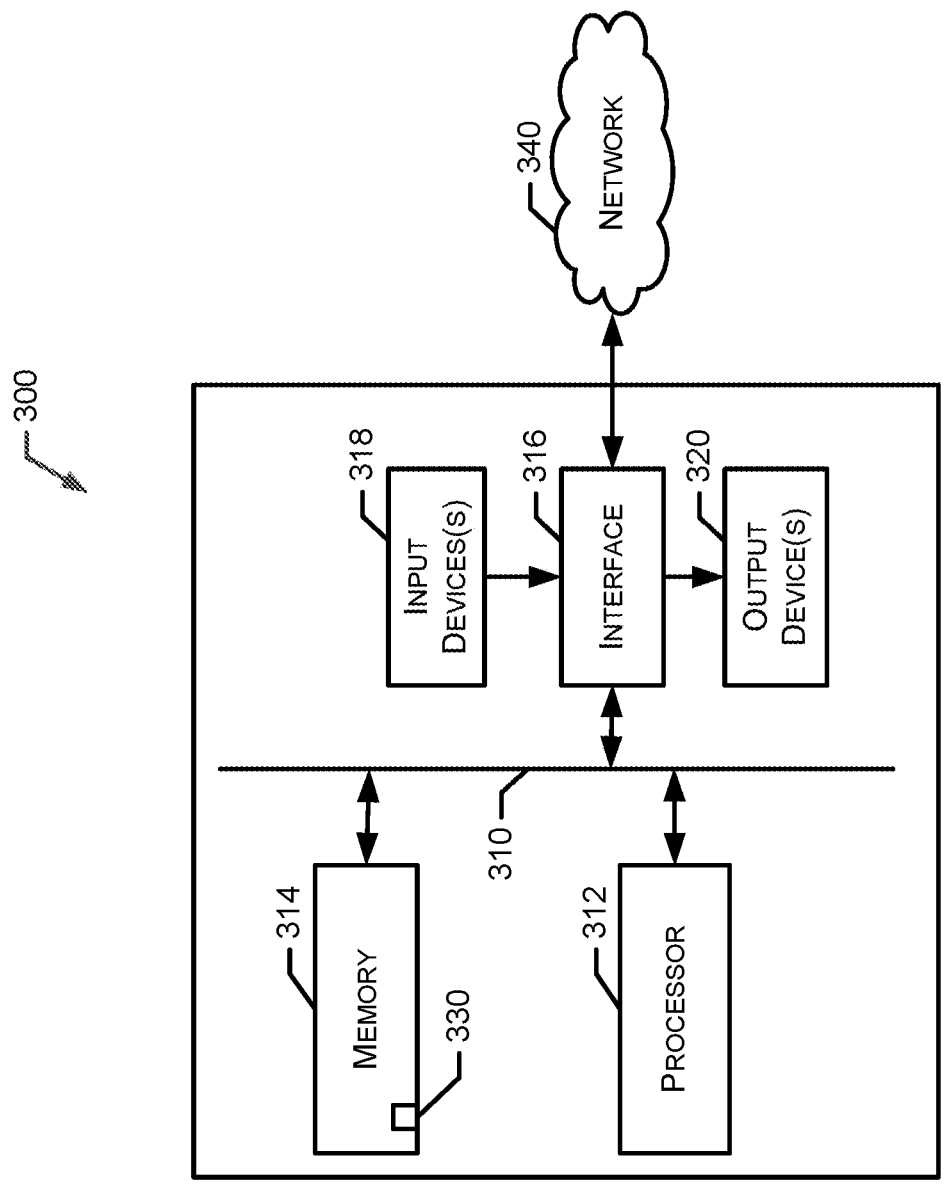
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. EXAMPLE TRADING DEVICE

Figure 4:
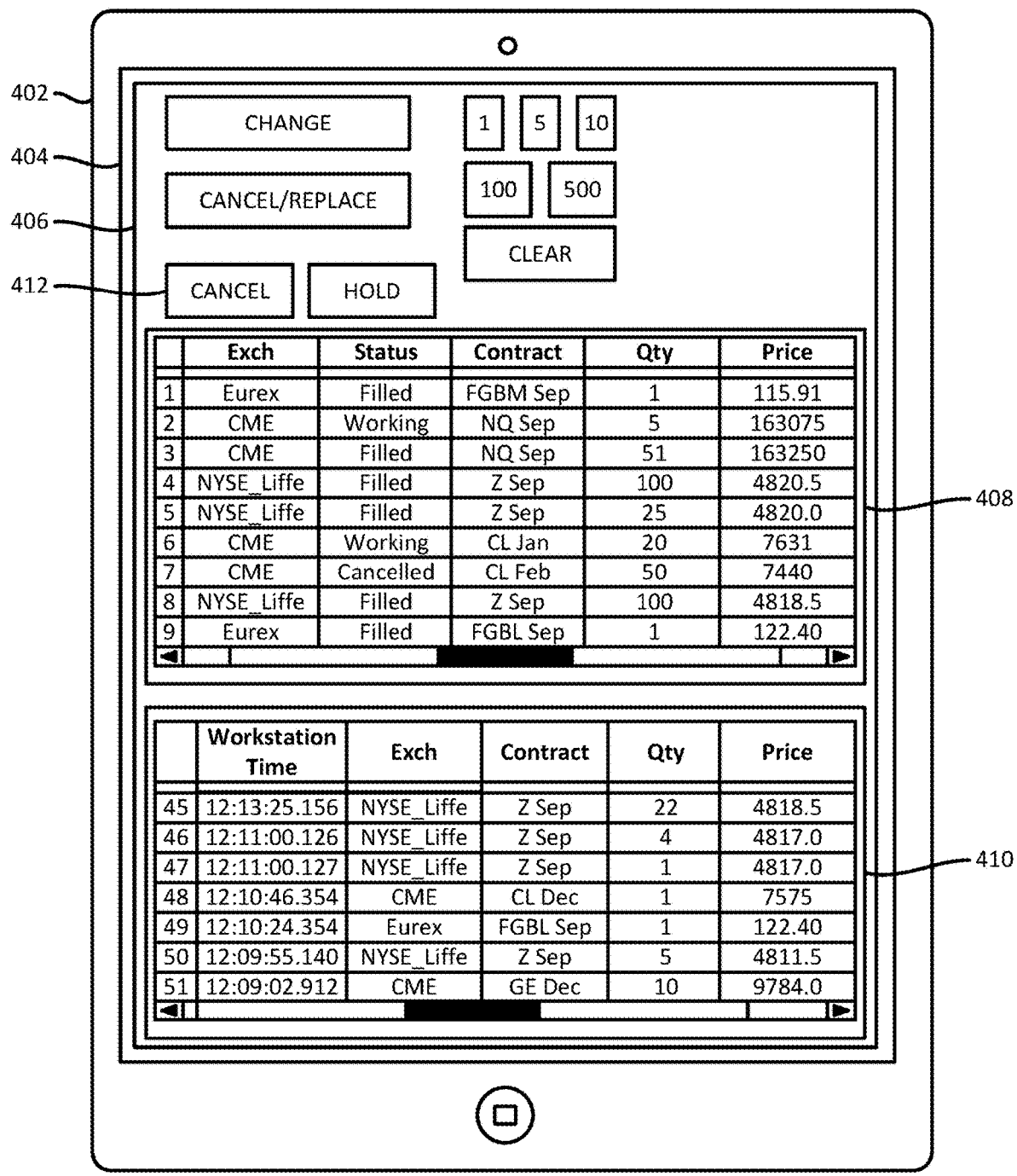
FIG. 4 illustrates a block diagram of an example trading device which may be employed with certain disclosed embodiments.

FIG. 4 illustrates an example trading device 402 which may be used to implement the disclosed embodiments. In the illustrated example of FIG. 4, the trading device 402 is a mobile device (e.g., a tablet, a smart phone, a laptop, etc.) that includes an example touch screen 404. In the illustrated example of FIG. 4, the touch screen 404 is an output device (e.g., the example output device 320 of FIG. 3) that accepts input by touch of finger(s) or a stylus (e.g., the example input device 318 of FIG. 3). In particular, the touch screen 404 displays or presents an example user interface 406 corresponding to a trading application (e.g., the example trading application 330 of FIG. 3). In addition, the touch screen 404 enables a user to interact directly with what is displayed by the user interface 406. For example, a user may control the brightness of the touch screen 404 by directly moving a graphical control corresponding to screen brightness.

In the illustrated example of FIG. 4, the user interface 406 (sometimes also referred to as a trading interface or trading window) of a trading application includes an orders window (or orders pane) (e.g., an example trading window 408) displaying order information for trade orders (e.g., all trade orders, a subset of trade orders, etc.), a fills window (e.g., an example trading window 410) displaying individual fills and their corresponding prices and an example trade action control 412. The user interface 406 may include additional, different, greater or fewer trading windows. For example, the orders window and the fills window may be combined into a single window.

Trade action controls enable execution or processing of a corresponding trade action such as placing a trade order, modifying an existing trade, deleting a trade order, etc. In the illustrated example of FIG. 4, the trade action control 412 corresponds to cancelling a trade order that has not been filled (e.g., a working trade order). Other trade action controls may correspond to additional or different trade actions.

In some examples, a component (e.g., a trade action control, a trading window, etc.) of a user interface may be in a locked (or disabled) mode or an unlocked (or enabled or activated) mode. For example, when a locked trade action control 412 is selected by a user, the selection is discarded. As a result, accidental contact with the locked trade action control 412 may not initiate the corresponding trade action. In contrast, selecting an unlocked trade action control initiates the corresponding trade action. In some examples, a disabled trade action control may appear different from an enabled trade action control. For example, a disabled trade action control may be marked, shaded a different color than an enabled trade action control, appear depressed or lower in comparison to an enabled trade action control, etc.

In some examples, one or more components of a user interface may be in a locked mode while other components of the user interface are in an unlocked mode. For example, the trade action control 412 and the orders window 408 may be in a locked mode thereby disabling selection of the trade action control 412 or elements of the orders window 408, while the fills window 410 may be unlocked and enable user selection of elements of the fills window 410.

In some examples, information presented by a locked component of a user interface may periodically (e.g., once a minute, etc.) and/or aperiodically (e.g., whenever the trading device 402 receives a push distribution, etc.) update. For example, while selecting an element of a locked orders window 408 may be disabled, the orders data displayed in the locked orders window 408 may update at a timing period selected by a user. As a result, a user can receive up-to-date orders data without the risk of accidentally selecting an element of the orders window 408 or initiating a cancel order via the trade action control 412.

In some examples, a component of a user interface may visually change when the component changes from the locked mode to the unlocked mode (or vice versa). For example, when the orders window 408 is in the unlocked mode, the fills window 410 may change to enable trade actions not previously presented to the user.

VI. EXAMPLE SYSTEMS AND METHODS TO ACTIVATE A TRADING DEVICE FOR USER INTERACTION

Figure 5:
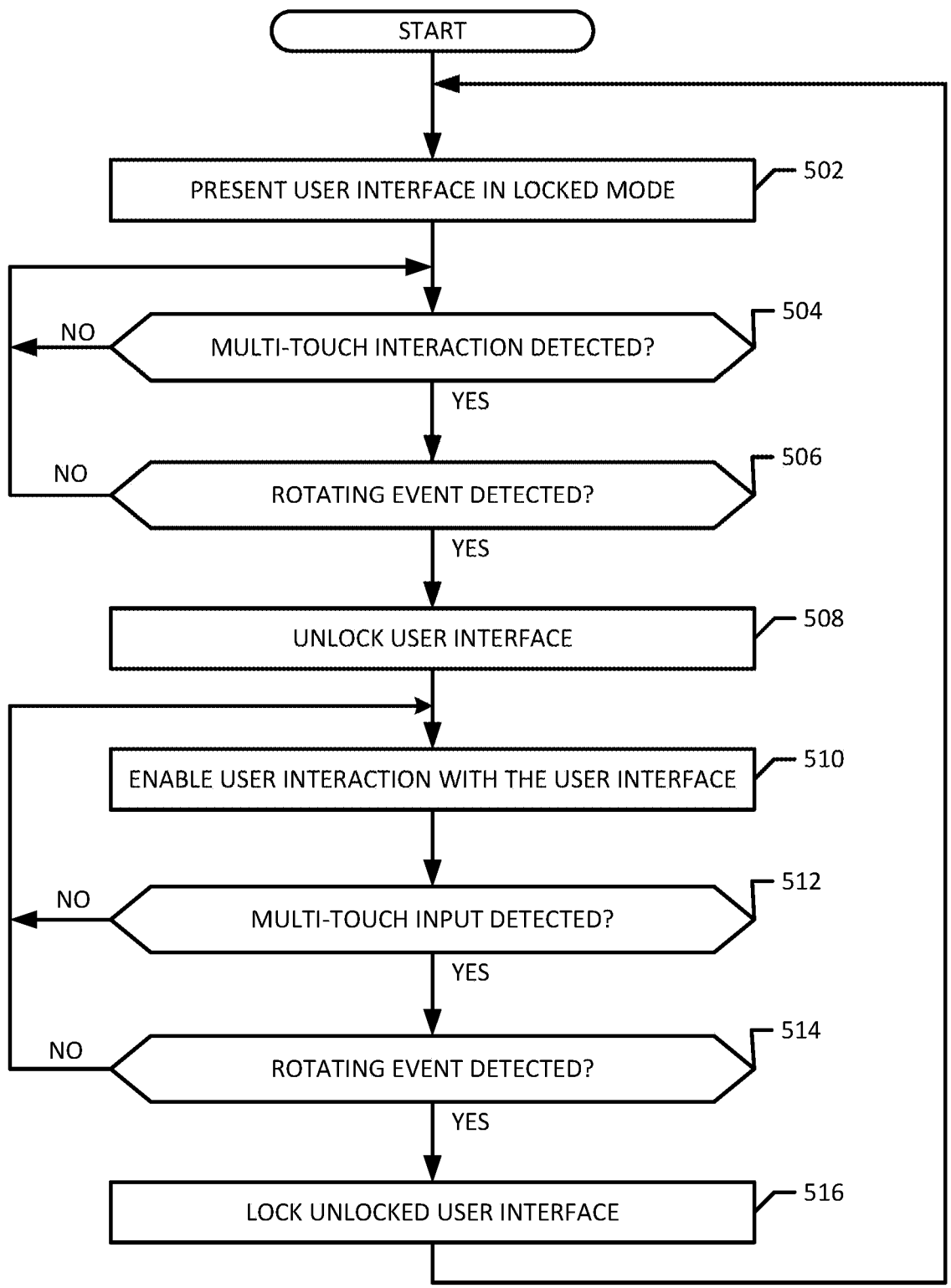
FIG. 5 illustrates a flow diagram representative of example machine readable instructions that may be executed to implement disclosed embodiments.
Figure 7:
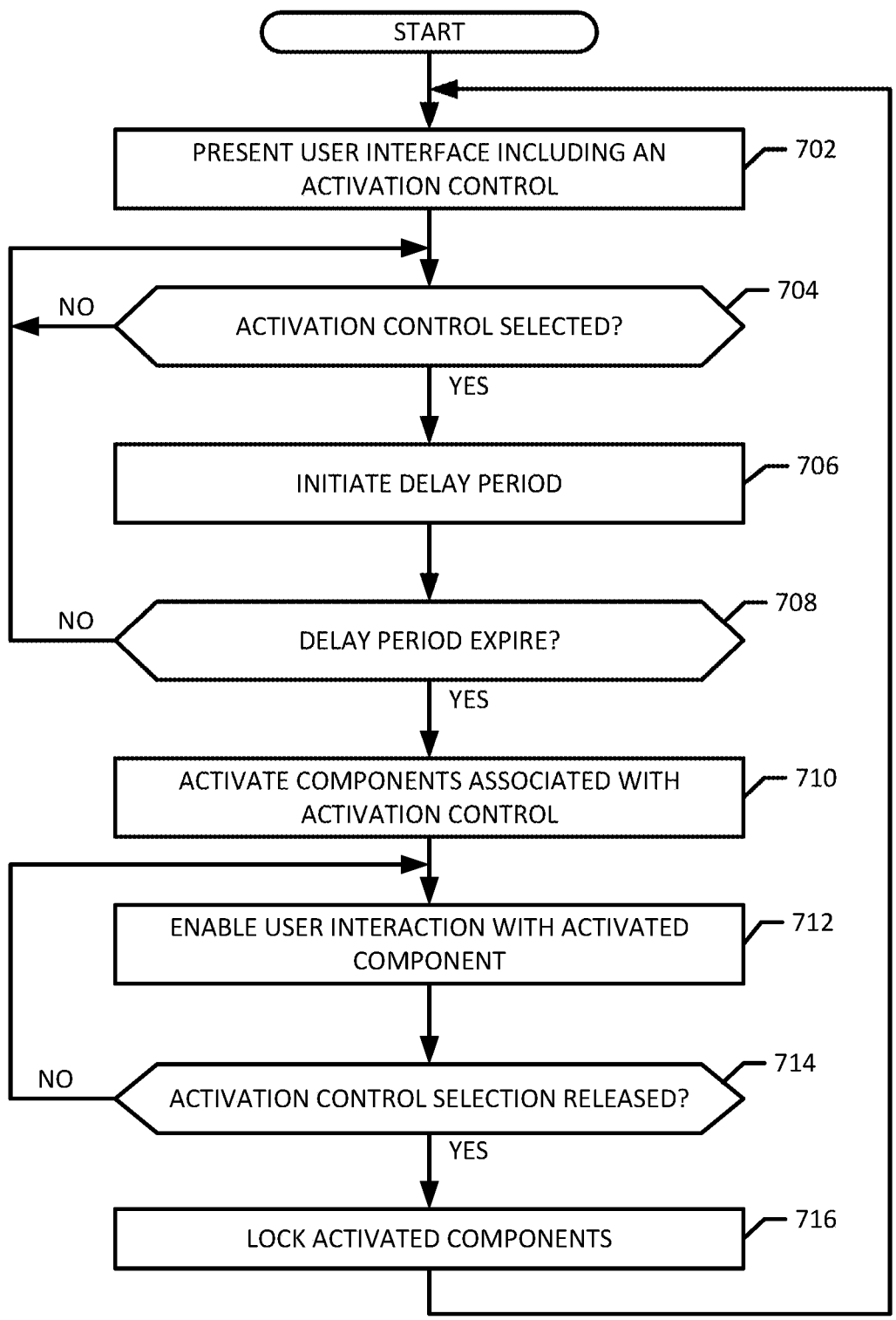
FIG. 7 illustrates a flow diagram representative of example machine readable instructions that may be executed to implement disclosed embodiments.

FIGS. 5 and 7 are flow diagrams representative of example operations that can be executed to implement the teachings of this disclosure. The example operations of FIGS. 5 and/or 7 can be implemented by, for example, the example trading device 110 of FIG. 1, the example trading device 210 of FIG. 2 and/or the example trading device 402 of FIG. 4. While the example trading device 402 of FIG. 4 is described as executing the example operations depicted in FIGS. 5 and 7 below, any suitable device can execute the example operations of FIGS. 5 and/or 7. The example operations of FIG. 5 implement unlocking a trading device to enable user interaction with a user interface of the trading device. The example operations of FIG. 7 implement activating a locked component of a user interface to enable user interaction with the component.

Figure 6A:
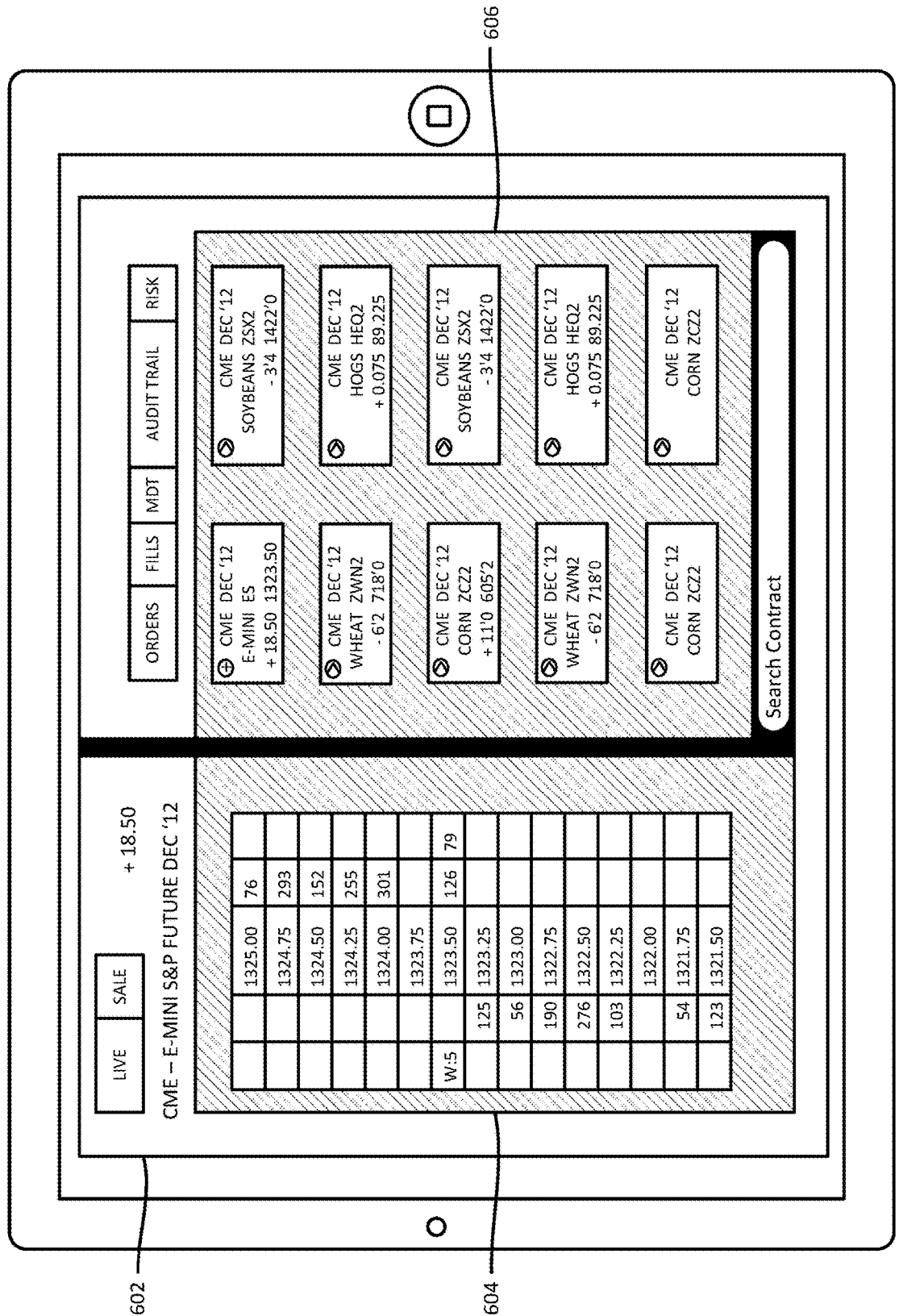
FIGS. 6A, 6B, 6C, 6D, 6E, 6F, and 6G illustrate an example user interface in accordance with disclosed embodiments.

The example process of FIG. 5 begins at block 502 by presenting a user interface including a locked component. FIG. 6a illustrates an example user interface 602 generated by, for example, a trading application. The user interface 602 includes a plurality of trading windows including an example trading interface 604 displaying trading positions for a tradeable object and an example market data window 606 displaying market data for the tradeable object. The trading interface 604 may be, for example, a substantially vertically aligned interface such as a ladder interface or display, a substantially horizontally aligned row-based trading interface, or any other desired interface configuration. In one example, the user interface may be MD TRADER®, X TRADER®, and/or one or more of the trading tools described in U.S. Pat. No. 6,772,132, filed on Jun. 9, 2000, the contents of which is incorporated herein by reference. In the illustrated example of FIG. 6a, the user interface 602 is in a locked mode. As a result, the trading windows 604, 606 are also in the locked mode and selecting the locked trading windows 604, 606 or elements of the locked trading windows 604, 606 is disabled.

Figure 6B:
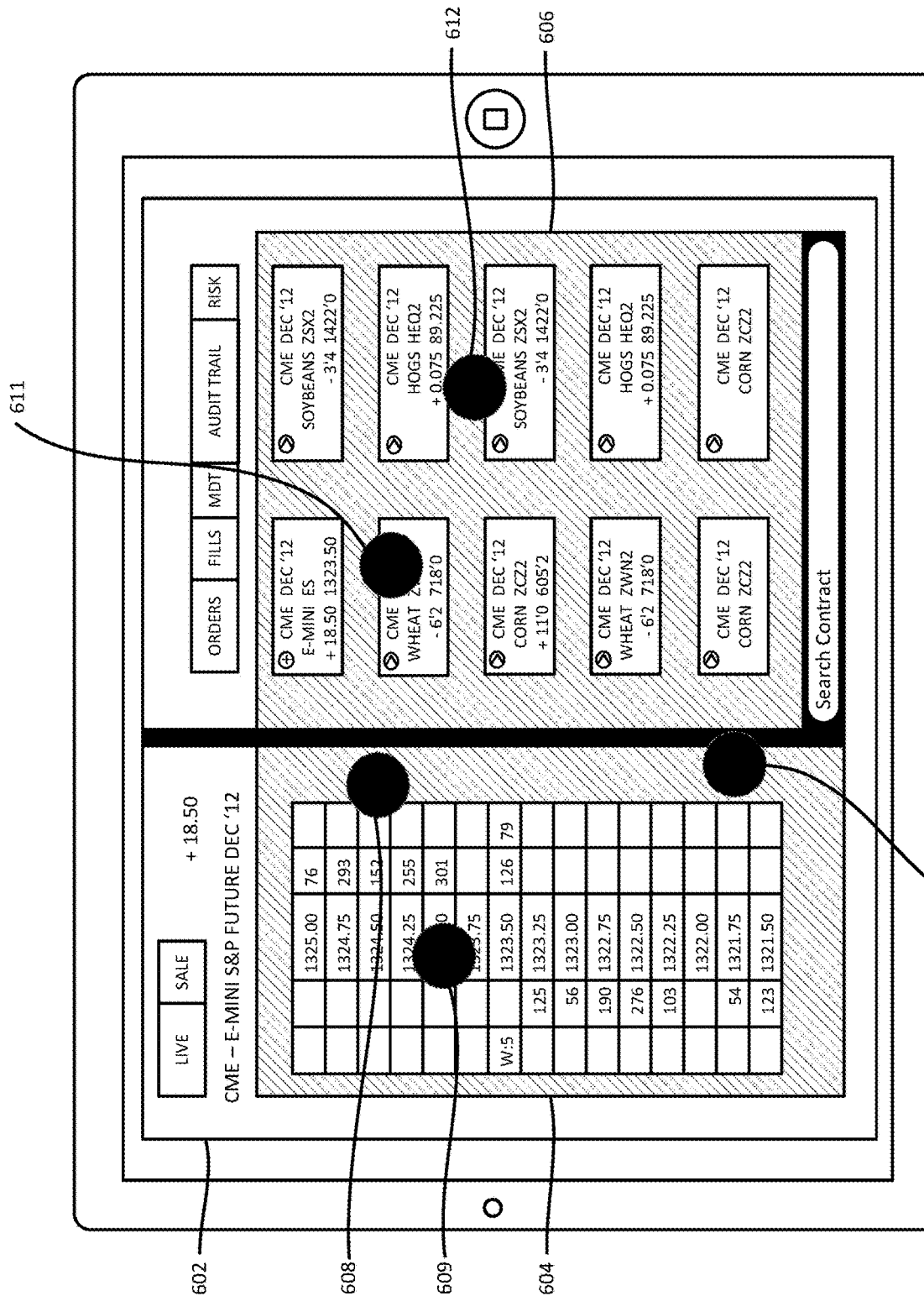

At block 504, a determination is made whether a gestural input is detected. For example, a gestural input may include a multi-touch interaction with the user interface such as a user touching the user interface with more than one finger. Detecting a multi-touch interaction rather than a single-touch interaction may be useful in reducing the risk of the user interface 602 incorrectly responding to a detected input. FIG. 6b illustrates the example user interface 602 including the trading interface 604 and the market data window 606. The example user interface 602 of FIG. 6b also includes example unlocking controls 608, 609, 610, 611, 612 overlaid on top of the trading interface 604 and the market data window 606. In some examples, the unlocking controls 608-612 are displayed while the user interface 602 is in the locked mode. In some other examples, the unlocking controls 608-612 may be presented when the multi-touch interaction is detected. In some such examples, the user may re-position the gestural input to cover the unlocking controls 608-612. In some examples, the user may cover a threshold amount of a specified number of the unlocking controls 608-612 before the gestural input is detected. For example, at least half of the unlocking controls 608-612 may be covered before the gestural input is detected. If no gestural input is detected at block 504, control returns to block 502 to detect a gestural input. Otherwise, control proceeds to block 506.

Figure 6C:
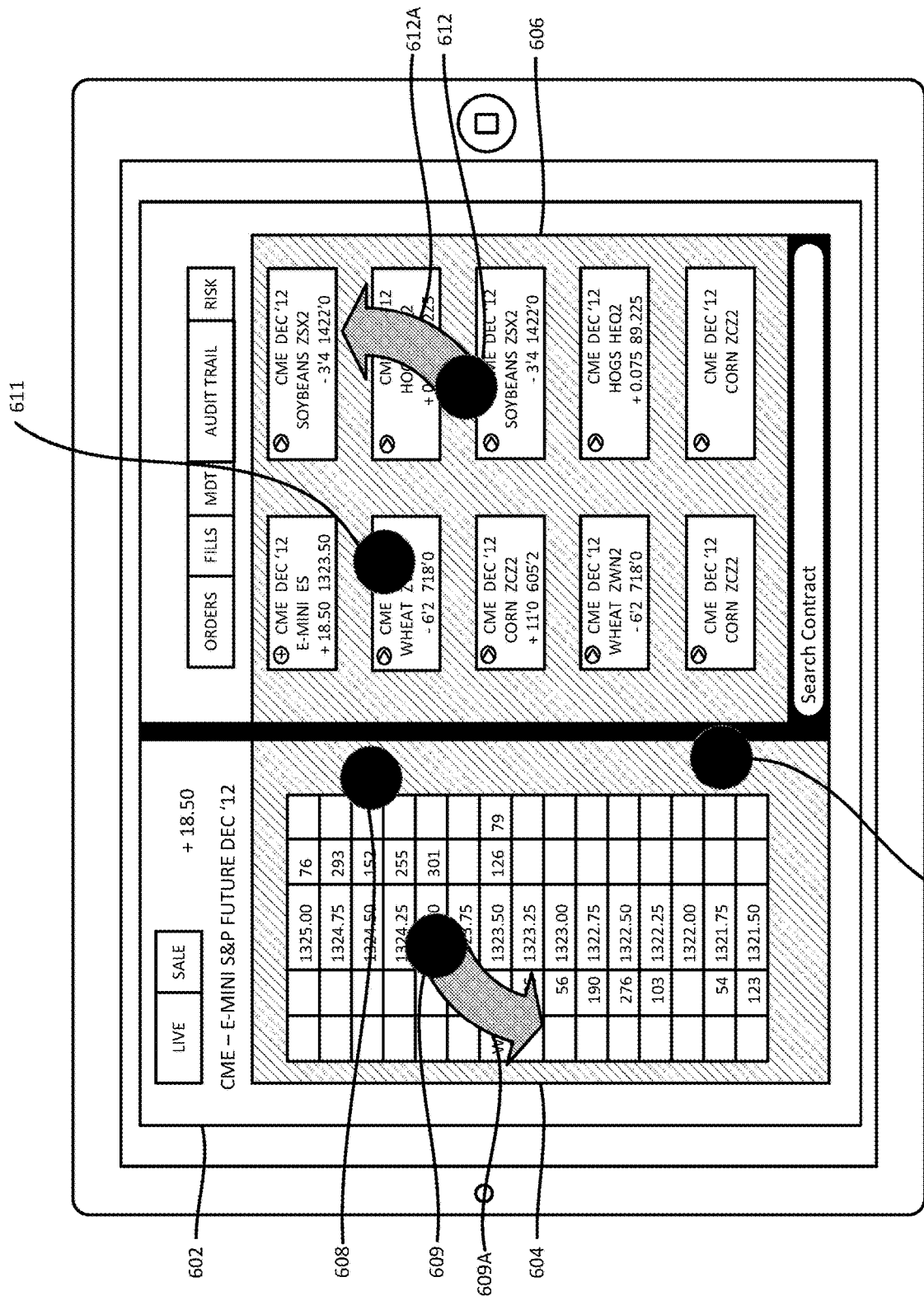

At block 506, a determination is made whether a gestural event is detected. For example, a gestural event may include rotating the gestural input in a counter-clockwise direction. FIG. 6c illustrates the example user interface 602 including the trading windows 604, 606 and unlocking controls 608-612. The example user interface 602 of FIG. 6c also includes example gestural event guides 609a, 612a. In the illustrated example of FIG. 6c, the gestural event guides 609a, 612a provide a visual guide to follow for executing the gestural event. In some examples, additional or fewer gestural event guides may be presented to the user to follow. In some examples, the gestural event is detected in conjunction with the gestural input detected at block 504. That is, as the gestural input is detected, the gestural event is also detected. For example, a user touches the unlocking controls 608-612 with, for example, fingers, and rotates the fingers in a counter-clockwise direction. In certain embodiments, the gestural event used to unlock the example user interface 602 may be changed each time a user unlocks the interface. For example, the first time a user unlocks the example user interface 602, the five (5) finger counter-clockwise gestural input depicted by the example unlocking controls 608-612 and the example gestural event guides 609a, 612a shown in FIG. 6c, may be recognized and accepted to unlock the interface. Subsequent unlocking actions may require a different gestural input such as, for example, a three (3) finger, clockwise rotating gesture utilizing the example unlocking controls 608-610 and clockwise indicating event guides (not shown) similar to the event guides 609a and 612a.

Figure 6D:
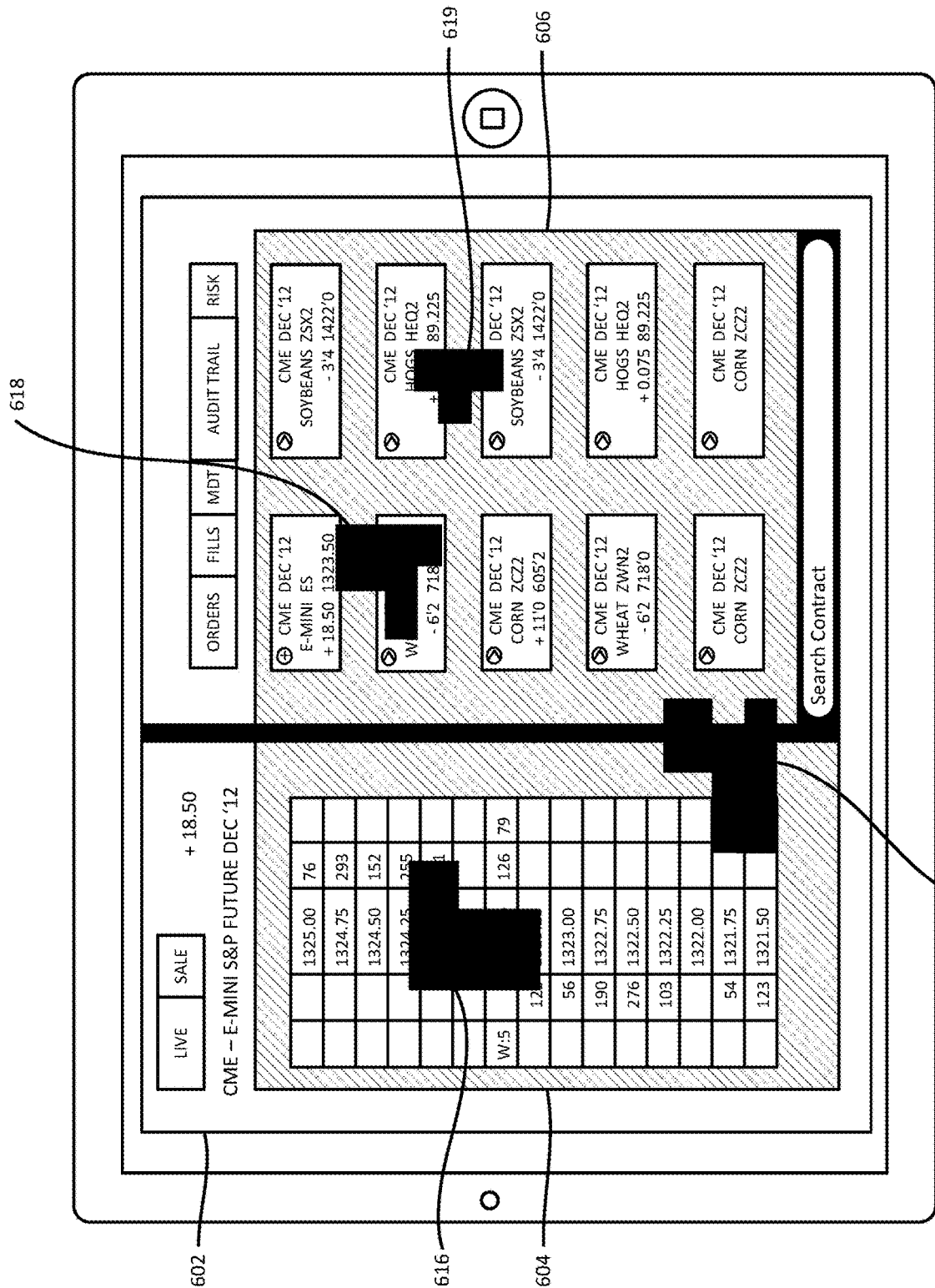

In some examples, an unlocking control may be directionally manipulated (e.g., relative to other unlocking controls, absolute to other unlocking controls, etc.) on the screen. For example, FIG. 6d illustrates the example user interface 602 including example unlocking controls 616-619. In the illustrated example of FIG. 6d, the unlocking controls 616-619 appear after a gestural input is detected. Once the gestural input is detected, the unlocking controls 616-619 are presented via the example user interface 602, and the respective unlocking controls 616-619 are positioned and/or otherwise manipulated by the user via the example user interface 602. For example, the unlocking controls 616-619 are moved across the example user interface 602 to solve a puzzle.

Figure 6E:
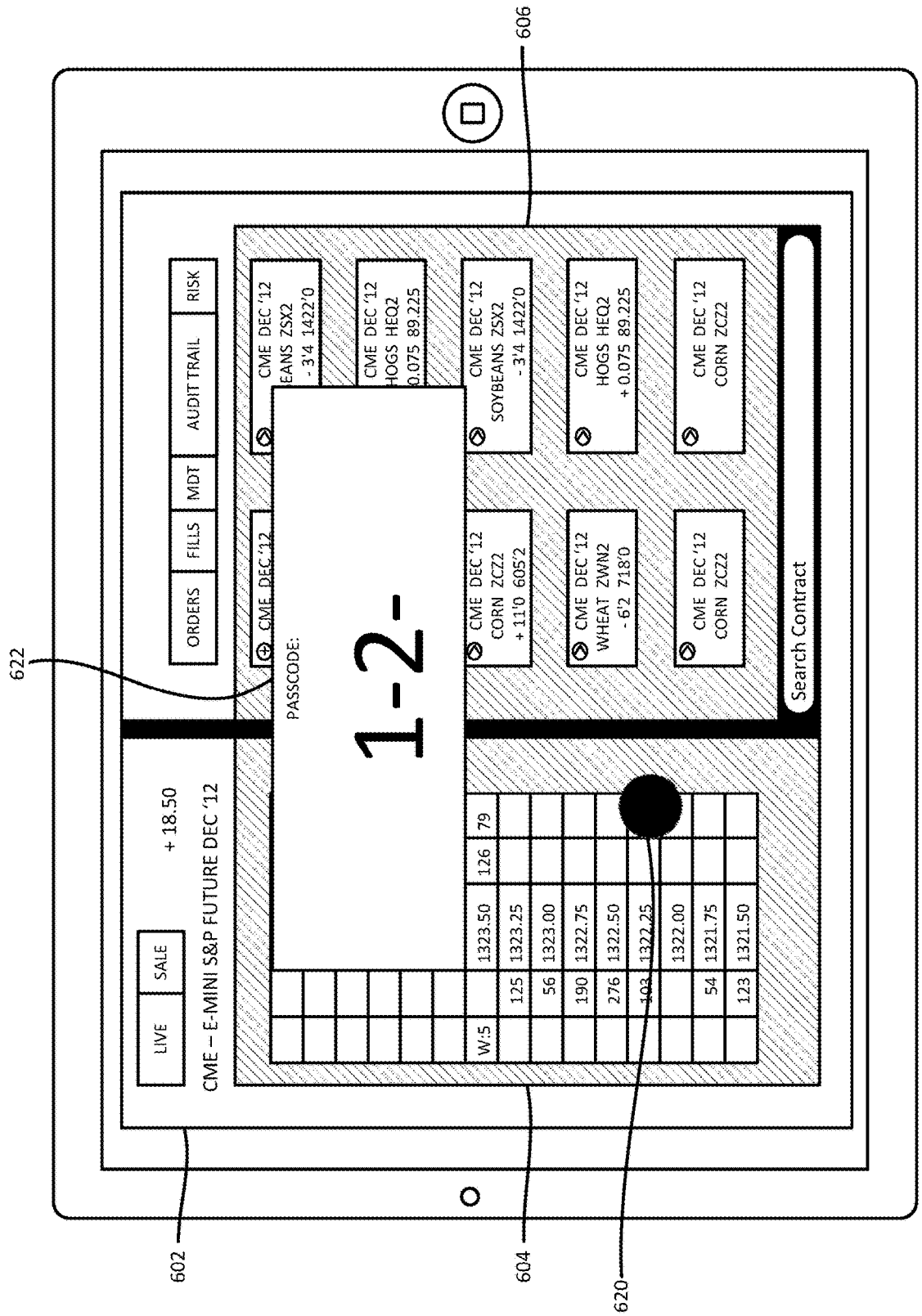

In some examples, an unlocking control may be used to enter a passcode to unlock the screen. For example, FIG. 6e illustrates the example user interface 602 including an example unlocking control 620 and an example user passcode display 622. In some examples, the user interface 602 may include two or more unlocking controls such as the example unlocking controls 608-612 of FIG. 6b. In the illustrated example of FIG. 6e, the user passcode display 622 displays symbols (e.g., alphanumeric symbols) entered by a user. For example, a gestural input may include a user selecting the unlocking control 620 via a fingertip. In some such examples, a gestural event may include rotating the gestural input in a clockwise direction and/or a counter-clockwise direction to cycle through passcode symbols. For example, a symbol displayed in the user passcode display 622 may change (e.g., from increasing in value to decreasing in value) in response to changing a first gestural event (e.g., rotating the gestural input in a clockwise direction) to a second gestural event (e.g., rotating the gestural input in a counter-clockwise direction). In some examples, the rotation direction of the gestural input may be changed to enter additional symbols. For example, rotating the unlocking control 620 in a counter-clockwise direction may enter a first passcode symbol, rotating the unlocking control 620 in a clockwise direction may enter a second passcode symbol, and rotating the unlocking control 620 in the counter-clockwise direction may enter a third passcode symbol. In some examples, the gestural event may include sliding the gestural input in an up and/or down direction relative to the user interface 602. In some other examples, the gestural event may include sliding the gestural input in a left and/or right direction relative to the user interface 602.

In some examples, the user passcode display 622 of FIG. 6e may display one symbol at-a-time (e.g., the user passcode display 622 clears after a respective symbol is entered). In some other examples, the user passcode display 622 may display a series of entered symbols (e.g., the user passcode display 622 continues to display the entered symbols). In some such examples, the user passcode display 622 may continue to display each respective symbol as entered (e.g., "0-1-2-3"), while in some other examples, the user passcode display 622 may change a previously entered symbol into a non-descript symbol (e.g., "*-*-*-3").

In some examples, if the gestural event is not detected within a period of time after the gestural input is detected, the gestural input is reset. If no gestural event is detected at block 506 or if the gestural input is reset, control returns to block 502 to detect a gestural input. Otherwise, control proceeds to block 508.

Figure 6F:
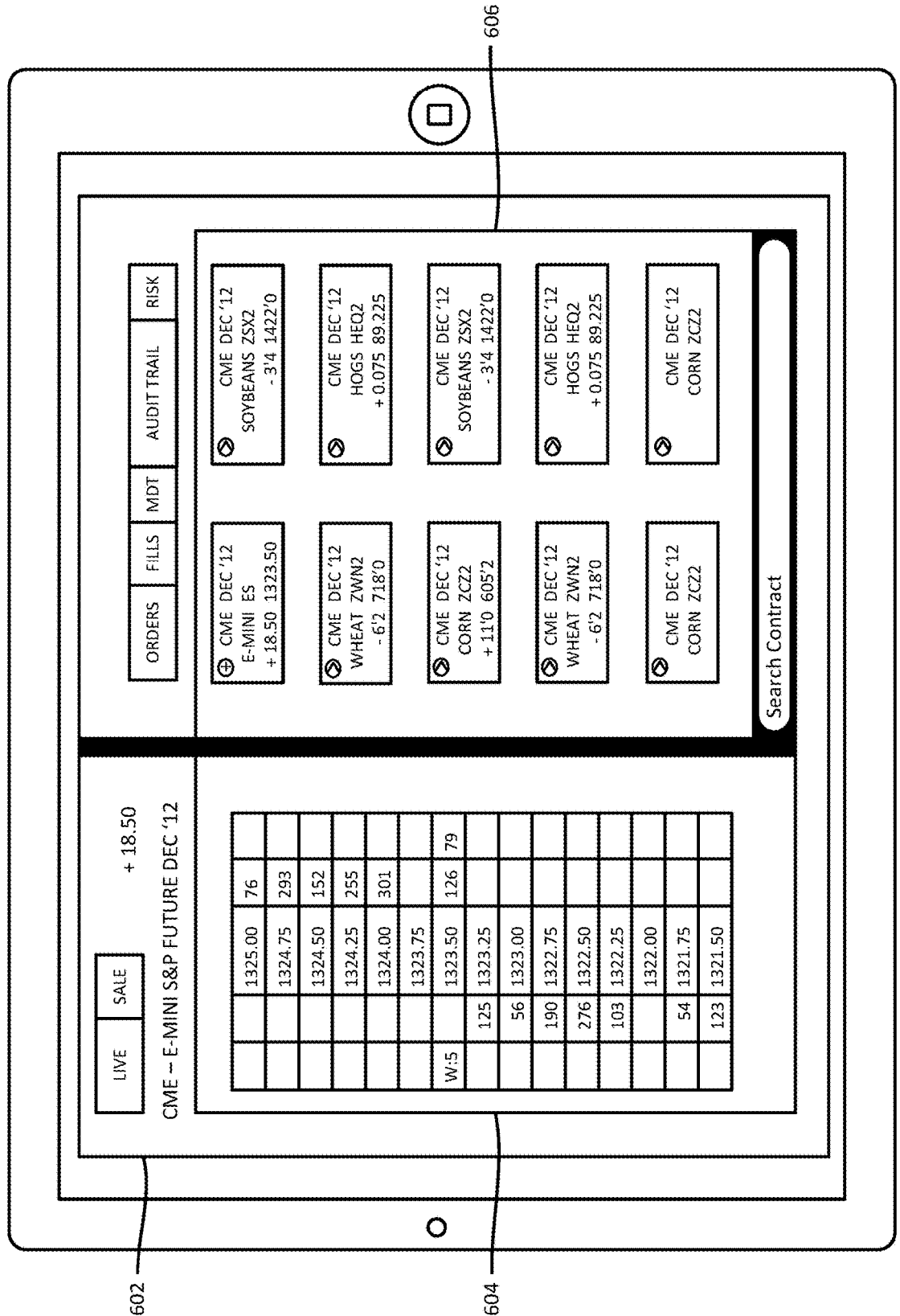

In response to detecting a gestural event, at block 508, the locked user interface is unlocked. FIG. 6f illustrates the example user interface 602 including trading windows 604, 606. In the illustrated example of FIG. 6f, the trading windows 604, 606 are unlocked and are unmarked. In some examples, when the locked user interface is unlocked, the unlocked user interface displays different or additional information. At block 510, user interaction with the user interface is enabled. In the illustrated example of FIG. 6f, a user may select, for example, a position displayed in the trading interface 604 for additional information.

In some examples, the unlocked user interface remains unlocked for a predetermined period of time. For example, the user interface may lock after a period of inactivity (e.g., lack of user interaction). In some examples, the user may be periodically prompted to confirm they are still present. In some such examples, when a period of inactivity completes or the presence of the user remains unconfirmed, the user interface may lock. In some examples, an unlocked user interface remains unlocked until a second gestural event is detected. In some such examples, the unlocked user interface may lock in response to the second gestural event. At block 512, a determination is made whether a second gestural input (e.g., a multi-touch interaction) is detected. For example, a second gestural input may include touching the user interface 602 with two or more fingers. In some examples, unlocking controls (e.g., the example unlocking controls 608-612) may appear overlaid on the user interface for the user to cover with, for example, two or more fingers. If a second gestural input is not detected at block 512, control returns to block 510 and user interaction with the unlocked user interface remains enabled. Otherwise, control proceeds to block 514.

Figure 6G:
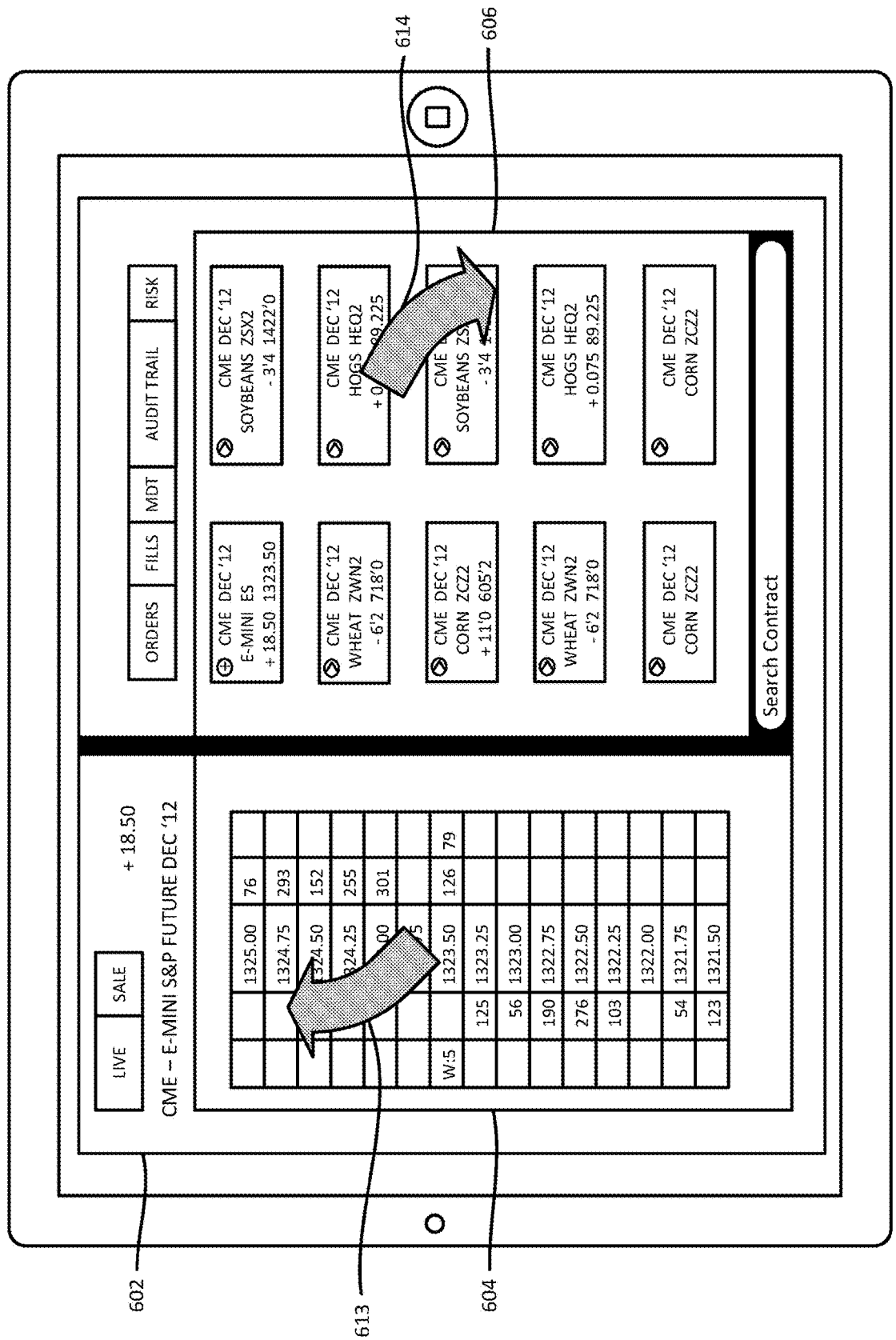

At block 514, a determination is made whether a second gestural event is detected. FIG. 6g illustrates the example user interface 602 including unlocked trading windows 604, 606. The example user interface 602 also includes gestural event guides 613, 614 for a user to follow. In the illustrated example of FIG. 6g, the second gestural event is a clockwise direction rotation of the second gestural input (e.g., the multi-touch interaction). If a second gestural event is not detected at block 514, control returns to block 510 and user interaction with the unlocked user interface remains enabled. Otherwise, control proceeds to block 516.

At block 516, the unlocked user interface is locked. For example, in response to detecting a clockwise direction rotation of a multi-touch interaction, the user interface locks and user interaction with the locked user interface is disabled. In some such examples, the locked user interface may appear shaded as the trading windows 604, 606 were illustrated in FIG. 6a. Control then returns to block 502 to present a locked user interface including locked trading windows.

In the example of FIG. 7, a user interface includes a locked component in which user interaction with elements of the component is disabled. In contrast to the example illustrated in the example process 500, in the example process 700, a locked component may be unlocked while a gestural event is detected and, when the gestural event is not detected, the component returns to a locked mode. In some examples, a gestural event may unlock components such as trade action controls that were not previously presented by the user interface.

Figure 8A:
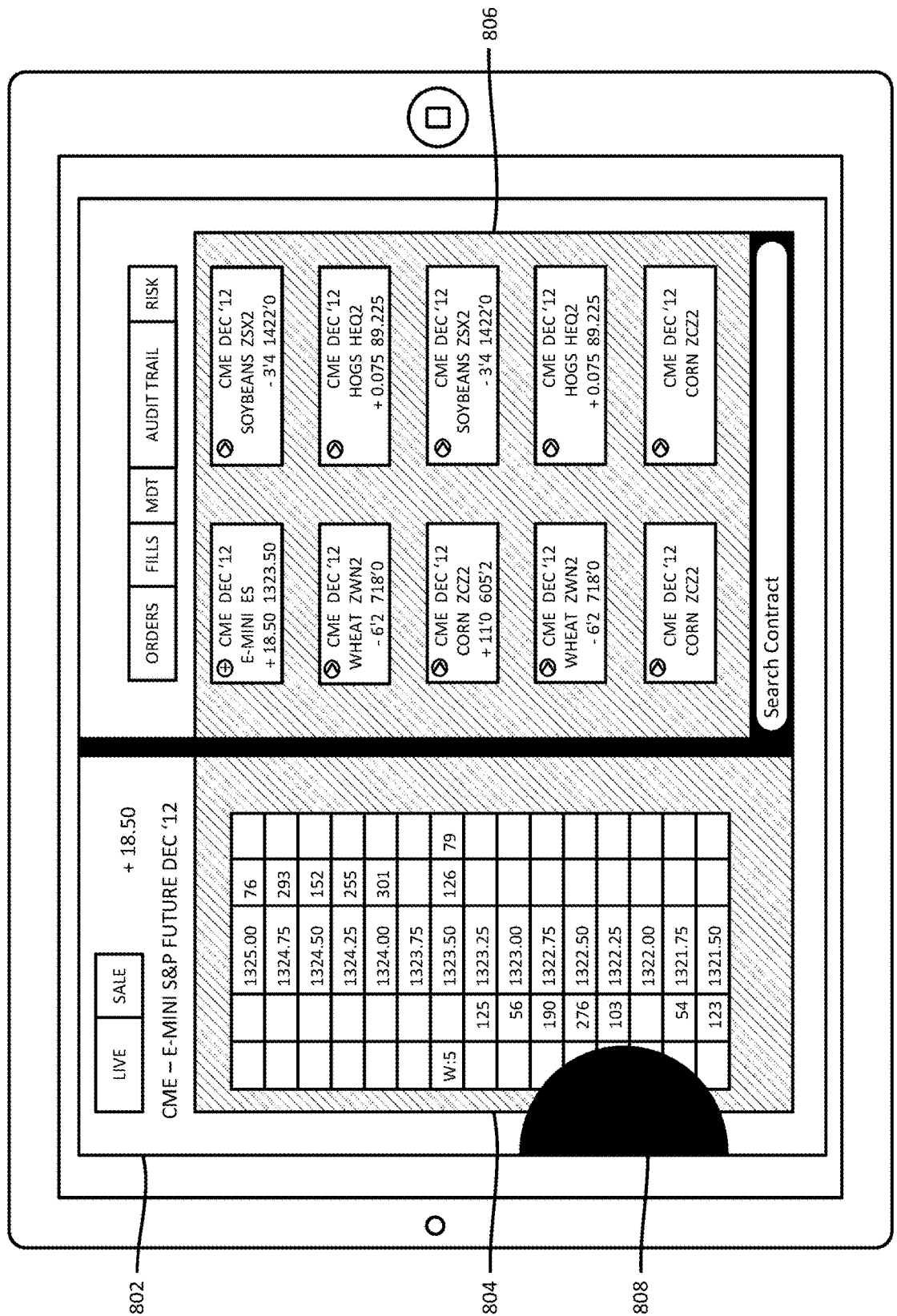
FIGS. 8A, 8B, 8C, 8D, and 8E illustrate an example user interface in accordance with disclosed embodiments.

The example process 700 of FIG. 7 begins at block 702 by presenting a user interface including an activation control corresponding to unlocking a locked component of the user interface. For example, a trade application may generate for display a user interface including one or more trading windows displaying various parameters of market data. FIG. 8a illustrates an example user interface 802 including an example trading interface 804 and an example content window 806. In the illustrated example of FIG. 8a, the example trading interface 804 displays trading positions for a tradeable object and the example content window 806 displays information corresponding to the tradeable object. For example, the content window 806 may display trade orders for the tradeable object, order fills for the tradeable object, available market data for the tradeable object, an audit trail associated with the tradeable object, a risk analysis for the tradeable object, etc. In the illustrated example, the trading windows 804, 806 are in a locked mode and user interaction with elements of the trading windows 804, 806 is disabled. In some examples, information displayed in the locked trading windows 804, 806 may update periodically and/or aperiodically. As a result, even while the trading windows 804, 806 are in the locked mode, as available positions for a tradeable object change, the trading positions displayed in the trading interface 804 may continue to update. In addition, corresponding information presented in the content window 806 may also update while the content window 806 is in the locked mode.

The example user interface 802 also includes an example activation control 808 to activate components associated with a locked trading window. In the illustrated example of FIG. 8a, a portion of the trading interface 804 is overlaid with the activation control 808 and the activation control 808 corresponds to the trading interface 804. That is, when the activation control 808 is activated, components (e.g., trade action controls) associated with trading are presented to the user. For example, activating activation control 808 may display trade action controls that enable trading positions, order entry, etc. In some examples, more than one activation control may be displayed. In some examples, an activation control may be associated with more than one trading window. That is, the number of, the location of, and/or the size of the activation control(s) may vary.

At block 704, a determination is made whether an activation control is selected. For example, a gestural input such as a user selecting the activation control 808 of FIG. 8a may be detected. If no activation control 808 is selected (e.g., within a period such as three seconds), control returns to block 704 to wait for an activation control selection. Otherwise, control proceeds to block 706.

At block 706, a delay period is initiated in response to the gestural input (e.g., activation control selection). In some examples, the gestural input is held for the duration of the delay period. For example, the activation control 808 of FIG.

8a may be held for a delay period of 1 second, 2 seconds, etc. The delay period may be useful in reducing the number of accidental component activations. For example, an activation control may be touched (e.g., via a finger, a stylus, etc.) in passing and the user may not intend on performing or executing any trade actions. If the gestural input is not held for the duration of the delay period, at block 708, control returns to block 704 to wait for an activation control selection. For example, if the activation control 808 is selected in passing (e.g., accidentally) and released before the delay period expires, the delay period may reset. Otherwise, control proceeds to block 710.

In some examples, a delay period may not be included. In some such examples, control may proceed to block 710 in response to detecting the gestural input (e.g., activation control selection) at block 704.

Figure 8B:
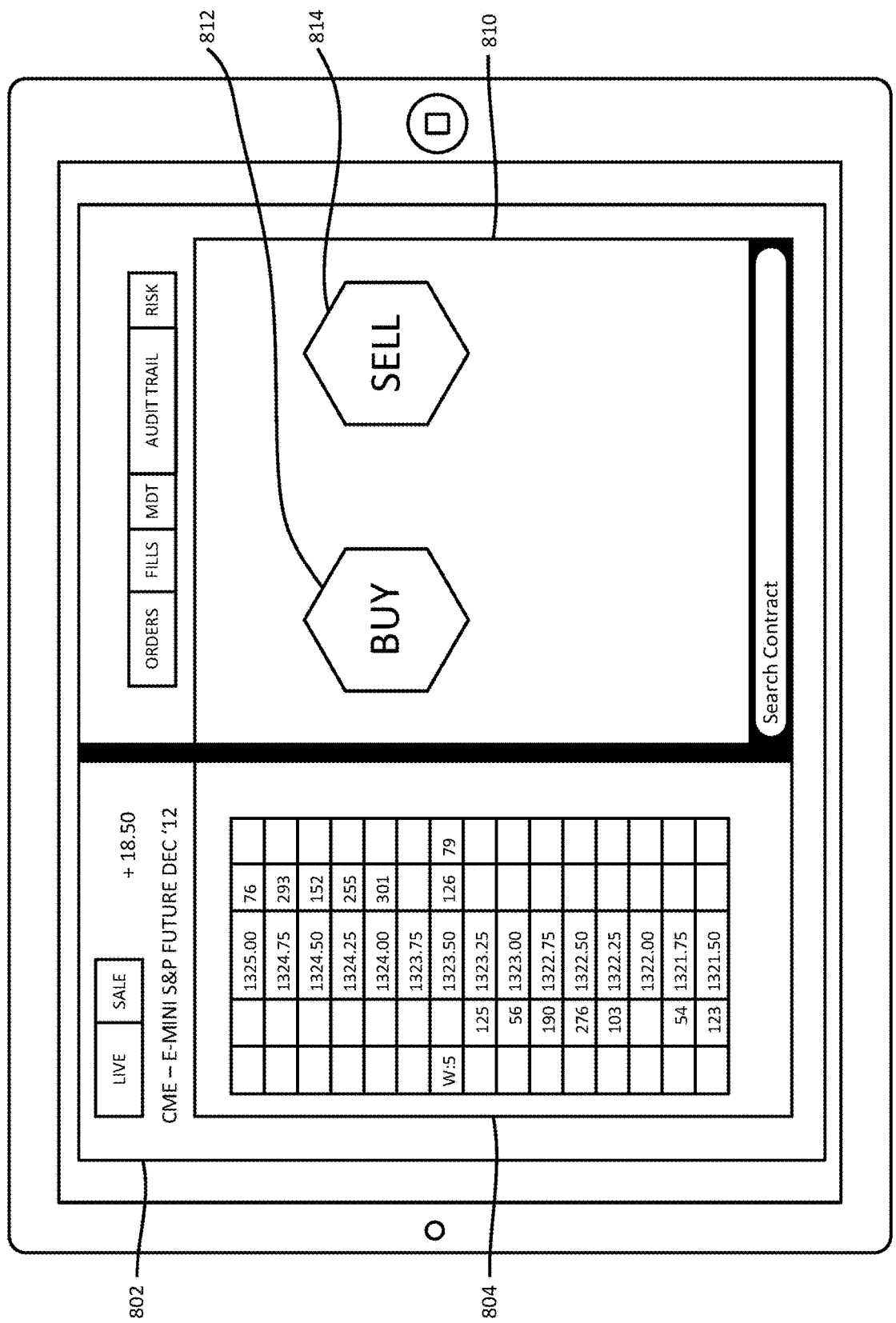

At block 710, components associated with the selected activation control are activated. For example, disabled trade action controls associated with the activation control may be activated. In some examples, one or more components of the user interface may change when the activation control is activated. FIG. 8b illustrates the example user interface 802 including the example trading interface 804. In the illustrated example of FIG. 8b, the activation control 808 of FIG. 8a is removed from the user interface when activated. In some examples, the activation control may be modified to enable more information to be displayed. For example, the activation control may move to a different location on the user interface. In some examples, the activation control may move based on user feedback. For example, while maintaining activation control selection (e.g., by touching the activation control with a finger), the user may move the finger to a different location on the user interface and cause the activation control to move to the different location as well. In some examples, the activation control may change in size when activated. For example, the activation control may become smaller to cover less area of the user interface and enable presenting more information via the trading window. In some other examples, the activation control may change to a transparent (or nearly transparent) control so that information under the activation control may be displayed.

In the illustrated example of FIG. 8b, when the activation control 808 of FIG. 8a is activated, the content window 806 of FIG. 8a changes to a trade actions window 810 displaying available or activated trade action controls. For example, the trade actions window 810 includes an example BUY control 812 to initiate a buy trade order (or send a buy trade message to, for example, the exchange 130 of FIG. 1) and an example SELL control 814 to initiate a sell trade order (or send a sell trade message to, for example, the exchange 130 of FIG. 1).

Figure 8C:
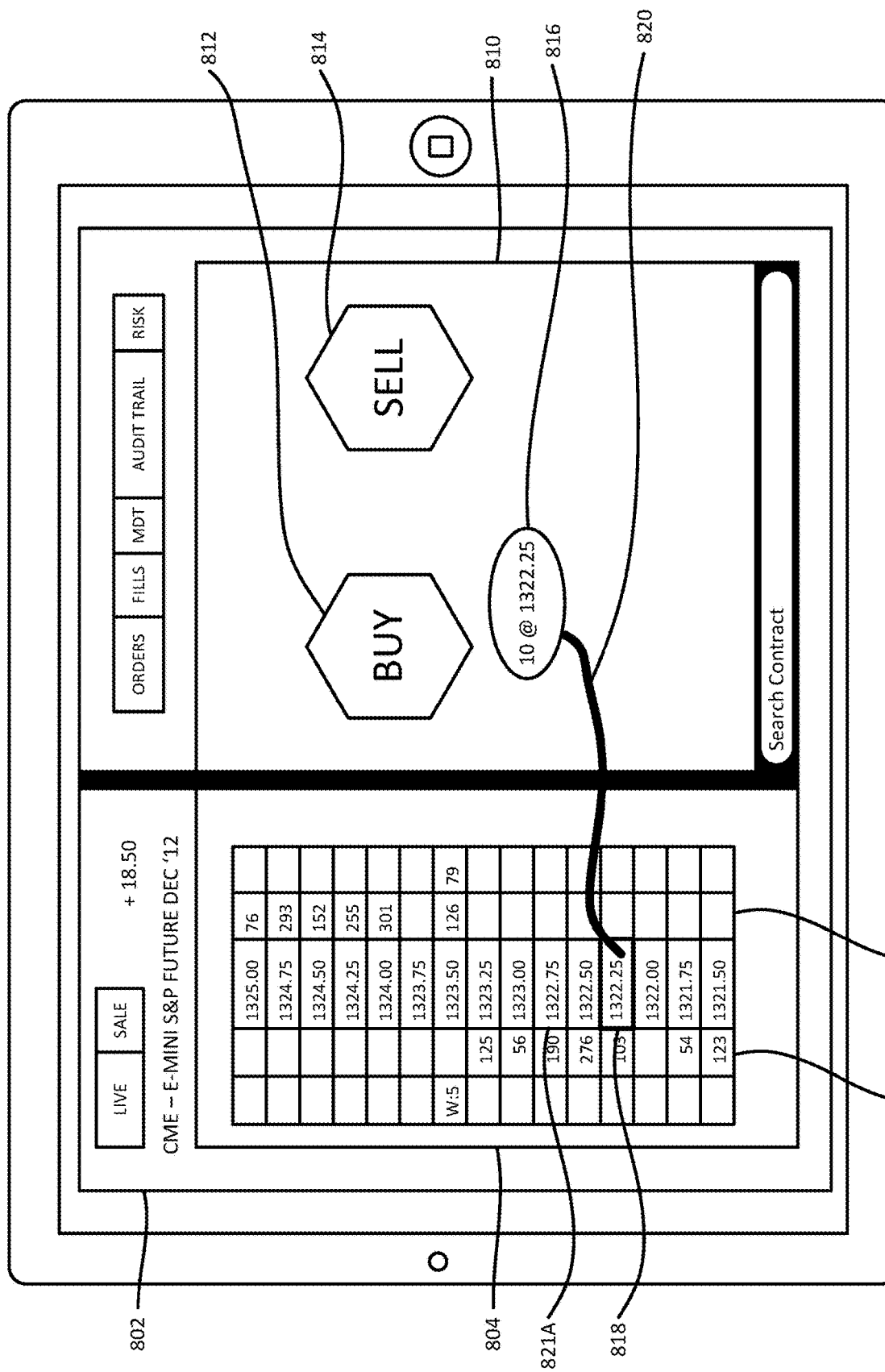

At block 712, user interaction with the activated components is enabled. For example, a user may initiate a trade action such as placing, cancelling or changing a trade order. FIG. 8c illustrates the example user interface 802 including trading windows 804, 810 and trade action controls 812, 814. In the illustrated example of FIG. 8c, a user is placing a trade order (indicated by an example trade order package 816) of ten units and at a price of 1322.25. In the illustrated example of FIG. 8c, the user selects an example value element such as the price element 818. The user, in turn, drags the selected price element 818 (e.g., via example path 820) to a trade action control corresponding to a desired trade action. For example, dragging the price element 818 to the BUY control 812 and releasing the selection at the BUY control 812 places a buy trade order of ten units at the price corresponding to the dragged price element (e.g., the price element 818). In some examples, the quantity to include in the trade order may be pre-selected. In some other examples, the user may select the trade order quantity while also placing the trade order. For example, the user interface 802 may include an additional trading window displaying quantity options for selection, current market bids for selection, current market offers (or asks) for selection, etc. In some such examples including a quantity window, the user may place a trade order by, for example, selecting a desired quantity (e.g., a quantity element), dragging the quantity element to a desired price element (e.g., the price element 818), and releasing the selection over the trade action control corresponding to the desired trade action (e.g., the BUY control 812 or the SELL control 814).

In some other examples, the user may place a trade order by, for example, selecting a desired quantity (e.g., a quantity element), dragging the quantity element to a desired price and releasing the selection over a desired trade action column (e.g., a column corresponding to a buy trade order or a column corresponding to a sell trade order). For example, using the example user interface 802 of FIG. 8c, a user may place a trade order to buy ten units at a price of 1322.75 by releasing the selection over example row 821A and example column 821B. Alternatively, the user may place an order to sell ten units at the price of 1322.75 by releasing the selection over the example row 821A and example column 821C.

Figure 8D:
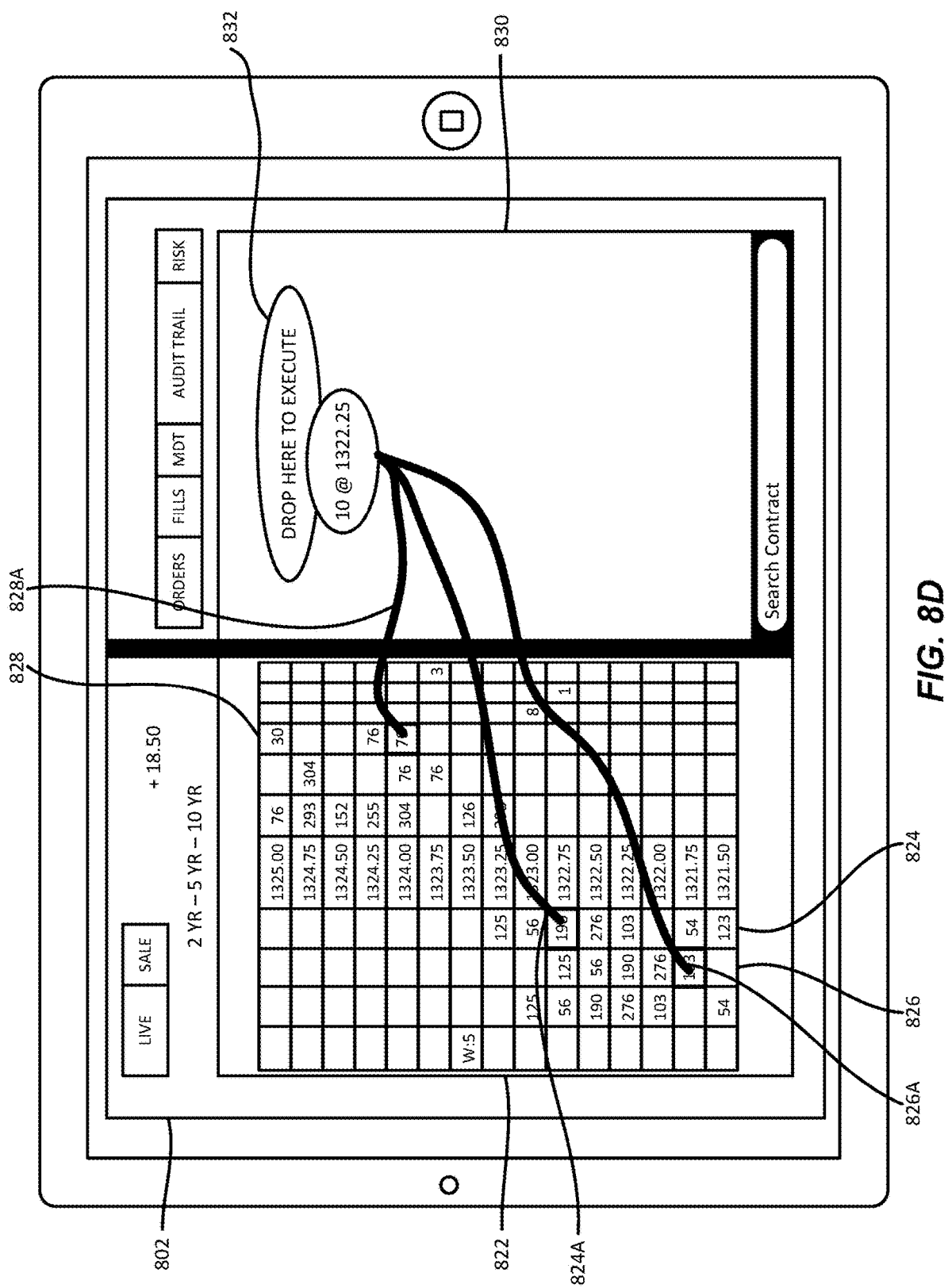

FIG. 8d illustrates another example user interface 802 in which user interaction is enabled. The example user interface 802 of FIG. 8d includes an example trading interface 822 including current market bids (e.g., example column 824) and current market offers for two-year contracts, current market bids (e.g., example column 826) and current market offers for five-year contracts, and current market bids and current market offers for ten-year contracts (e.g., example column 828). The example user interface 802 also includes an example trade actions window 830 including a trade action control 832, which replaced the example content window 806 of FIG. 8a. In the illustrated example of FIG. 8d, a trade action is placed by releasing a selected element (e.g., from column 824, column 826 or column 828) over the trade action control 832. Releasing an element from the trading interface 822 over the trade action control 832 executes a buy trade order or a sell trade order depending on the initial element selected.

In the illustrated example of FIG. 8d, six different paths for placing a trade order are possible, and three different example paths 824A, 826A, 828A for placing a trade order are displayed. That is, rather than placing a trade order by selecting a price element, in the illustrated example of FIG. 8d, the user may execute a buy trade order by selecting an element from a current market bids column (e.g., the example column 824, 826). In addition, the user may execute a sell trade order by selecting an element from a current market offers column (e.g., the example column 828). As described above, in some examples, the quantity to include in the trade order may be pre-selected. In some other examples, the user may select the trade order quantity while also placing the trade order.

Figure 8E:
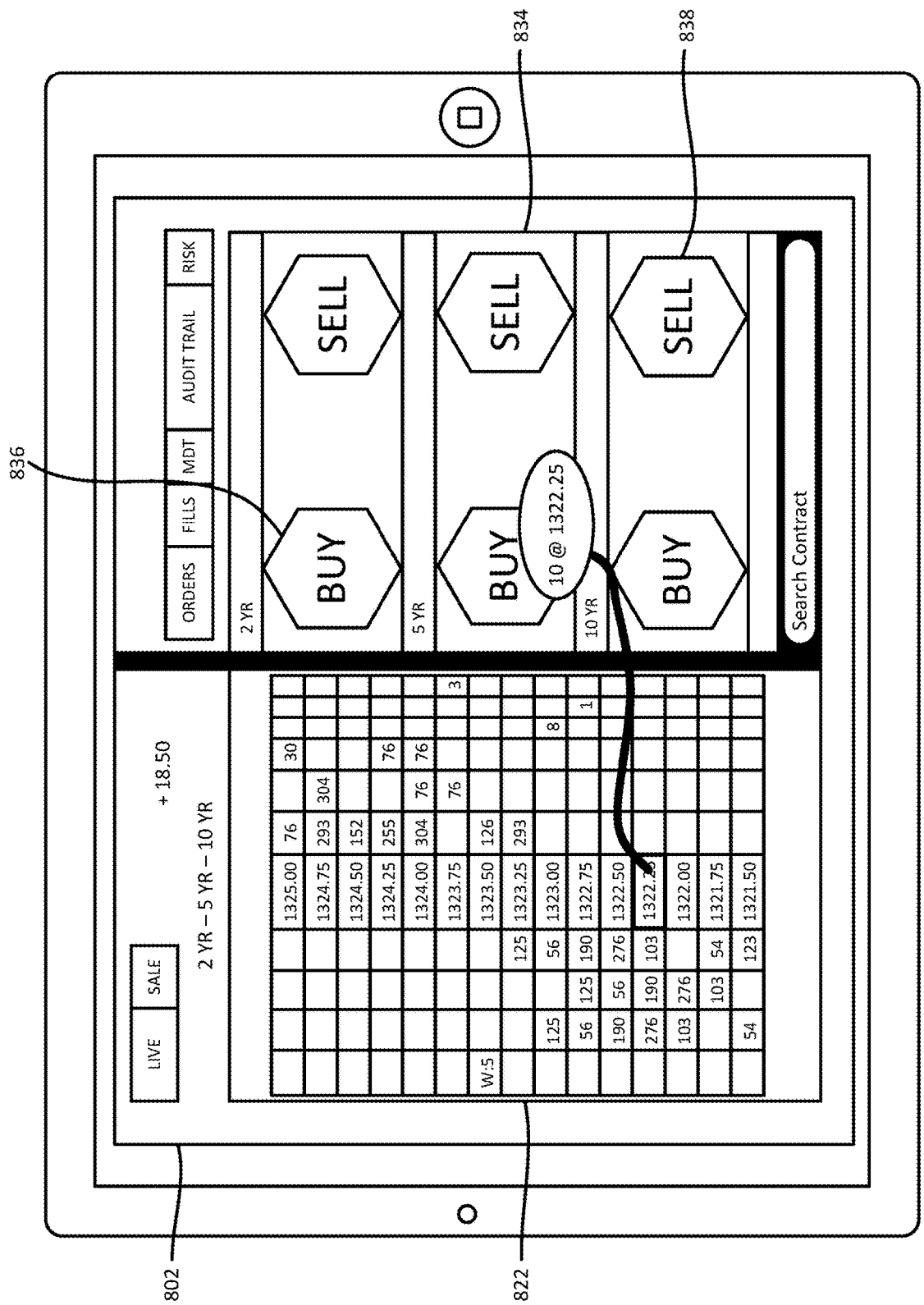

FIG. 8e illustrates another example user interface 802 in which user interaction is enabled. The example user interface 802 includes the example trading interface 822 of FIG. 8d and an example trade actions window 834 including separate BUY controls and SELL controls for the different tradeable objects. For example, releasing an element over example BUY control 836 places a buy trade order for a two-year contract. In addition, releasing an element over example SELL control 838 places a sell trade order for a ten-year contract. As described above, in some examples, the quantity to include in the trade order may be preselected. In some other examples, the user may select the trade order quantity while also placing the trade order.

Returning to the example process 700 of FIG. 7, at block 714, if the selected activation control is released, control proceeds to block 716 and the activated component are locked to disable user interaction. For example, the user interface may return to the example user interface 802 of FIG. 8a including the example trading interface 804 and the example content window 806. Control then returns to block 702 to present a user interface including an activation control associated with a locked component of the user interface.

Otherwise, if, at block 714, the selected activation control remains selected (e.g., held), control returns to block 712 to enable user interaction with the activated component. In other words, the activated components of the user interface remain activated while the activation control is selected and are locked when the activation control is released.

Figure 9:
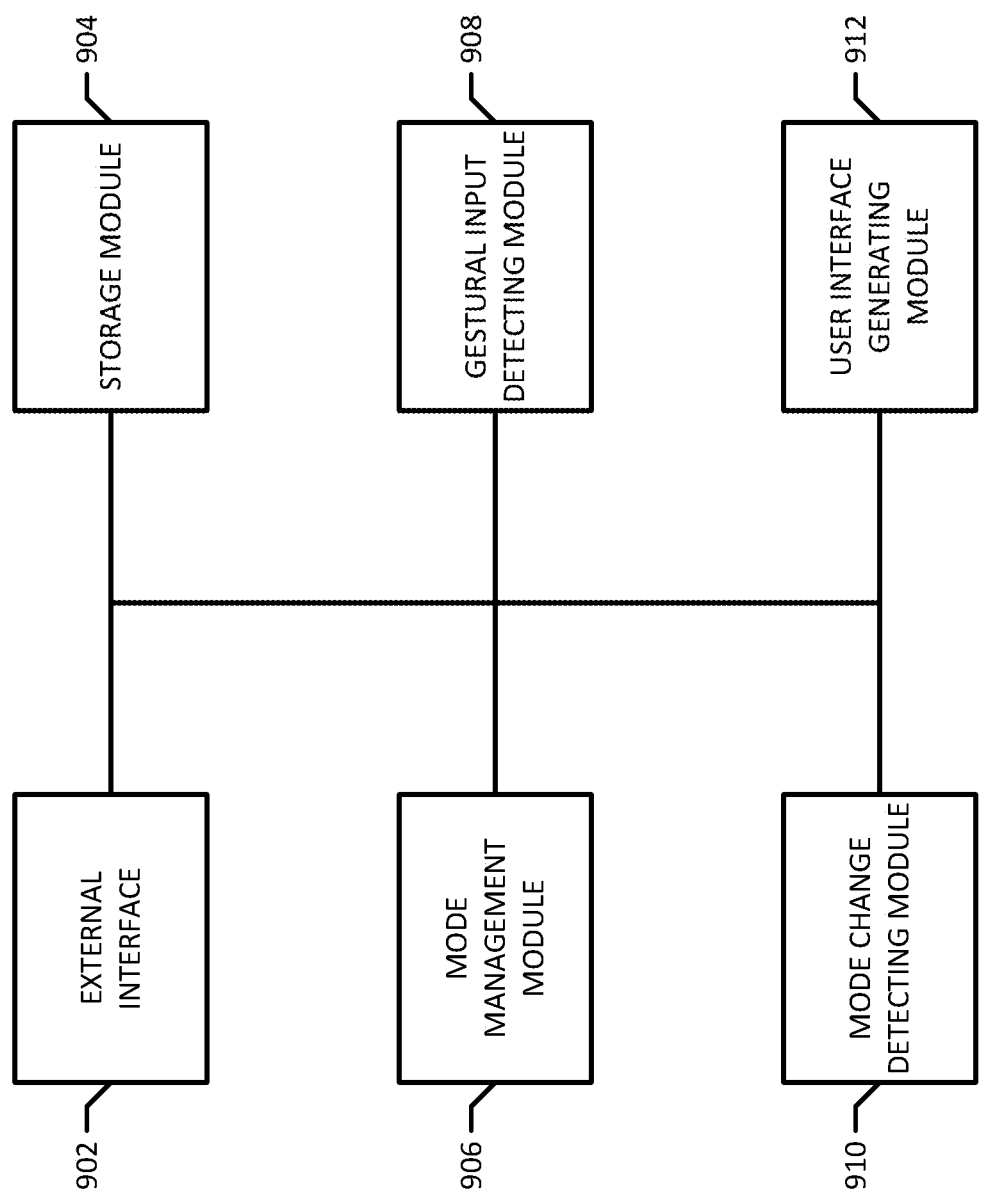
FIG. 9 illustrates a block diagram of an example system which may be employed with certain disclosed embodiments.

FIG. 9 is a block diagram of an example system 900 that may implement and/or execute the example operations of FIGS. 5 and/or 7. In some examples, the system 900 may be implemented as part of software (or an application) associated with the trading device 110 of FIG. 1, the gateway 120 of FIG. 1 and/or the electronic exchange 130 of FIG. 1. In some examples, the system 900 may be implemented as computer implemented code or instructions operable independent of software associated with the trading device 110 of FIG. 1, the gateway 120 of FIG. 1 and/or the electronic exchange 130 of FIG. 1. In some examples, the features and functionality of the system 900 may be implemented in hardware operable in connection with the trading device 110 of FIG. 1, the gateway 120 of FIG. 1 and/or the electronic exchange 130 of FIG. 1.

The example system 900 of FIG. 9 includes an example external interface 902, an example storage module 904, an example mode management module 906, an example gestural input detecting module 908, an example mode change detecting module 910 and an example user interface generating module 912. In some examples, the external interface 902 receives user input via, for example, the trading device 110 of FIG. 1. In some examples, the external interface 902 receives market information from, for example, the gateway 120 of FIG. 1, the electronic exchange 130 of FIG. 1 and/or an intermediary component. For example, market information or data updates may be communicated from the gateway 120 to the trading device 110. In some such examples, the external interface 902 of the example system 900 receives the market information updates and stores the full market information updates in the example storage module 904. The example storage module 904 may be implemented with any number and/or type(s) of tangible storage medium(s), memory(-ies), memory device(s) and/or memory disc(s). In some examples, the external interface 902 outputs information to display on a trading screen. For example, the external interface 902 may communicate to an output device what information to display or present to a user.

The example mode management module 906 of the example system 900 manages the mode of the user interface of a trading application and/or the component(s) of the user interface. In some examples, the mode management module 906 may store the mode of the user interface and/or components in a data structure (e.g., in the example storage module 904). For example, the mode management module 906 may maintain whether a user interface is in a locked mode or unlocked mode. In addition, the mode management module 906 may maintain whether a component is in a locked mode or activated mode. In some examples, the mode management module 906 may update the status of the user interface and/or components based on information received from other modules in the system 900. For example, the mode management module 906 may receive an indication that a gestural event to unlock the user interface was detected (e.g., from the mode change detecting module 910). In such instances, the mode management module 906 may update the mode of the user interface from the locked mode to the unlocked mode. In some examples, the mode management module 906 may include a timer to determine whether, for example, to change the mode of the user interface based on inactivity. For example, when the user interface is in an unlocked mode, the mode management module 906 may initiate a timer when user interaction is not detected (e.g., via the example gestural input detecting module 908). When a period of inactivity expires, the mode management module 906 updates the mode of the user interface to locked.

The example gestural input detecting module 908 of the example system 900 determines whether a user interaction meets the threshold for a gestural input. In the illustrated example of FIG. 9, when the gestural input detecting module 908 receives an indication of user interaction (e.g., from the external interface 902), the gestural input detecting module 908 retrieves the mode of the user interface from the mode management module 906. If the user interface is in the unlocked mode, the gestural input detecting module 908 retrieves the mode of components (e.g., trading windows, trade action controls, etc.) displayed in the user interface. Otherwise, the gestural input detecting module 908 determines whether the user interaction meets a threshold included in the information received from the mode management module 906. For example, a threshold for a locked user interface may include determining if a minimum amount of activation controls presented by the user interface is covered via a multi-touch interaction. In some other examples, a threshold for a locked component may include determining if an activation control associated with the locked component is selected.

The example mode change detecting module 910 of the example system 900 determines whether criterion for a mode change of the user interface or component is satisfied. In the illustrated example of FIG. 9, the mode change detecting module 910 determines mode changing criterion based on the mode of the user interface or components of the user interface and a detected gestural event. For example, when the user interface is in a locked mode, the mode change detecting module 910 determines whether a counter-clockwise rotation of the gestural input (e.g., multi-touch interaction) is detected. In some examples when the user interface is in an unlocked mode, the mode change detecting module 910 determines whether a clockwise rotation of the gestural input (e.g., multi-touch interaction) is detected. In some examples when the component is in a locked mode, the mode change detecting module 910 determines whether an activation control selection is held. In some examples when the component of the user interface is in an activated mode, the mode change detecting module 910 determines whether the selected activation control is released. In the illustrated example of FIG. 9, when a mode change criterion is satisfied, the mode change detecting module 910 sends a message indicating the mode change of the user interface or component of the user interface to the mode management module 906. Otherwise, the mode change detecting module 910 sends a message to the gestural input detecting module 908 indicating the detected gestural event did not satisfy the mode change criterion. In some such examples, the gestural input detecting module 908 may reset the gestural input detection and wait for another user interaction.

In some examples, the mode change detecting module 910 may include a timer to determine whether to send an indication to the gestural input detecting module 908 to reset the gestural input detection. For example, if the mode change criterion is not satisfied before the timer expires, the mode change detecting module 910 may send the reset indication to the gestural input detecting module 908. In some such examples, receiving the gestural input detection from the gestural input detecting module 908 may initiate the timer.

The example user interface generating module 912 of the example system 900 generates the user interface to display or present to the user based on information retrieved from the mode management module 906. For example, the user interface generating module 912 may display a locked user interface including live updates of market data presented by the components of the user interface. In some examples, when the mode management module 906 receives a mode change indication (e.g., from the mode change detecting module 910), the user interface generating module 912 changes the display of the user interface and/or components of the user interface accordingly. For example, a locked user interface may display general market information while an unlocked user interface may display trading windows including executable trade action controls. In some examples, when a locked component is activated via an activation control selection and hold, the user interface may update to include a previously un-presented trading window or trade action controls.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A system including:
a client device, wherein the client device includes at least one processor and a memory, wherein the memory includes instructions that, when executed, cause the at least one processor to perform a set of operations including:
generate a user interface of a trading application, wherein the user interface includes a lockable portion and a single activation control that corresponds to an unlock region;
detect a first detected gestural input with respect to the single activation control of the user interface, wherein the first detected gestural input includes a selection of the single activation control;
detect a first gestural event with respect to the single activation control associated with the first detected gestural input, wherein the first gestural event includes a continued hold of the single activation control after the selection of the single activation control by the first detected gestural input;
initiate a delay period in response to the mode change detecting module detecting the first detected gestural input with respect to the single activation control of the user interface, wherein the delay period is reset when the first gestural event is not detected;
unlock, in response to the mode change detecting module detecting the first gestural event with respect to the single activation control associated with the first detected gestural input, the lockable portion of the user interface to enable user interaction with activated components associated with the trading application during the continued hold of the single activation control;
detect a second gestural event with respect to the single activation control associated with a second detected gestural input, wherein the second gestural event includes a release of the single activation control to end the continued hold of the single activation control; and
lock, in response to the mode change detecting module detecting the second gestural event with respect to the single activation control associated with the second detected gestural input, the lockable portion of the user interface to disable user interaction with the activated components associated with the trading application.

2. The system of claim 1, wherein the set of operations further includes:
move the single activation control from a current location on the user interface to a different location of the user interface when the first detected gestural input is detected with respect to the single activation control.

3. The system of claim 2, wherein the single activation control is moved to the different location of the user interface in response to user feedback.

4. The system of claim 1, further including changing, by the computing device, a size of the single activation control when the mode change detecting module detects the first detected gestural input with respect to the single activation control.

5. The system of claim 1, wherein the set of operations further includes:
   change the single activation control to a substantially transparent control when the mode change detecting module detects the first detected gestural input with respect to the single activation control.

6. The system of claim 1, wherein the first gestural event is detected at the end of the delay period.

7. The system of claim 1, wherein the activated components include an order entry component.

8. The system of claim 1, wherein the first detected gestural input includes a multi-touch interaction.

9. The system of claim 8, wherein the gestural event includes rotating the gestural input in a direction.

10. The system of claim 9, wherein rotating the gestural input in a direction includes rotating the gestural input in a second direction; and in response to the detected second direction, unlocking the unlocked portion of the user interface.

* * * * *